US011440132B2

(12) United States Patent
Ishiguro et al.

(10) Patent No.: US 11,440,132 B2
(45) Date of Patent: Sep. 13, 2022

(54) FRICTION STIR WELDING APPARATUS

(71) Applicant: Hitachi Power Solutions Co., Ltd., Hitachi (JP)

(72) Inventors: Koichi Ishiguro, Hitachi (JP); Shun Shinohara, Hitachi (JP); Kohei Funahara, Hitachi (JP); Tomio Odakura, Hitachi (JP); Yoshinori Oyama, Toyota (JP); Takayuki Ikariyama, Toyota (JP); Yoshiaki Kobayashi, Seto (JP)

(73) Assignee: Hitachi Power Solutions Co., Ltd., Hitachi (JP)

( * ) Notice: Subject to any disclaimer, the term of this patent is extended or adjusted under 35 U.S.C. 154(b) by 0 days.

(21) Appl. No.: 17/273,610

(22) PCT Filed: Sep. 17, 2019

(86) PCT No.: PCT/JP2019/036313
§ 371 (c)(1),
(2) Date: Mar. 4, 2021

(87) PCT Pub. No.: WO2020/059686
PCT Pub. Date: Mar. 26, 2020

(65) Prior Publication Data
US 2021/0316390 A1    Oct. 14, 2021

(30) Foreign Application Priority Data

Sep. 19, 2018  (JP) .............................. JP2018-174589
Sep. 19, 2018  (JP) .............................. JP2018-174593
(Continued)

(51) Int. Cl.
*B23K 20/00* (2006.01)
*B23K 20/12* (2006.01)
*B23K 101/00* (2006.01)

(52) U.S. Cl.
CPC ........ *B23K 20/123* (2013.01); *B23K 20/1245* (2013.01); *B23K 2101/006* (2018.08)

(58) Field of Classification Search
CPC .. B23K 20/123; B23K 20/125; B23K 20/126; B23K 20/22; B23K 20/26; B23K 20/1215; B23K 20/122; B23K 20/1255
See application file for complete search history.

(56) References Cited

U.S. PATENT DOCUMENTS 6,595,403 B2    7/2003  Okamura et al.
10,967,510 B2 *  4/2021  Kai ........................ B25J 9/1641
(Continued)

FOREIGN PATENT DOCUMENTS

CN    102039480 A    5/2011
CN    103052462 A    4/2013
(Continued)

OTHER PUBLICATIONS

Korean-language Office Action issued in Korean Application No. 10-2020-7036645 dated Nov. 24, 2021 with English translation (10 pages).
(Continued)

*Primary Examiner* — Erin B Saad
(74) *Attorney, Agent, or Firm* — Crowell & Moring LLP

(57) ABSTRACT

Provided are a friction stir welding apparatus and a friction stir welding method capable of highly accurate position control in a Z-axis direction (vertical direction) of a joining tool when a joint target member is subjected to friction stir welding by the friction stir welding apparatus. The friction stir welding apparatus includes a joining tool which consists of a shoulder portion and a probe portion and is inserted into a joint target member to rotate, a joining head which holds the joining tool, an apparatus body which holds the joining head, rotates the joining tool, and moves the joining tool,
(Continued)

and a control device which controls an operation of the joining tool, in which the control device has a reference setting mode where a correction reference used for correction of misalignment in the Z-axis direction of the joining tool which occurs when the joint target member is joined by the joining tool is set in a stage before the joining tool is inserted into the joint target member, a joining mode where the joining tool is inserted into the joint target member and the joint target member is joined, and a correction mode where an amount of position fluctuation of a tip of the joining tool with respect to the correction reference which occurs when the joining tool joins the joint target member is measured and correction is performed when the amount of position fluctuation exceeds a predetermined threshold value.

9 Claims, 12 Drawing Sheets

(30) Foreign Application Priority Data

Sep. 28, 2018 (JP) .............................. JP2018-183133
Sep. 28, 2018 (JP) .............................. JP2018-183135

(56) References Cited

U.S. PATENT DOCUMENTS

| | | | | |
|---|---|---|---|---|
| 10,994,367 | B2* | 5/2021 | Tomioka | B23K 20/128 |
| 11,285,562 | B2* | 3/2022 | Odakura | B23K 20/1265 |
| 2002/0145031 | A1* | 10/2002 | Hirano | B23K 20/123 |
| | | | | 228/2.1 |
| 2003/0047584 | A1* | 3/2003 | Okamoto | B23K 20/123 |
| | | | | 228/2.1 |
| 2004/0074944 | A1* | 4/2004 | Okamoto | B23K 20/122 |
| | | | | 228/2.1 |
| 2007/0181637 | A1* | 8/2007 | Hirano | B23K 20/1265 |
| | | | | 228/101 |
| 2008/0073409 | A1 | 3/2008 | Ostersehlte | |
| 2011/0041982 | A1* | 2/2011 | Fleming | B23K 20/125 |
| | | | | 156/64 |
| 2011/0089146 | A1 | 4/2011 | Takahashi et al. | |
| 2012/0006883 | A1 | 1/2012 | Nishida et al. | |
| 2014/0034709 | A1* | 2/2014 | Oki | B23K 20/123 |
| | | | | 228/2.1 |
| 2014/0061283 | A1 | 3/2014 | Shoji et al. | |
| 2017/0304935 | A1 | 10/2017 | Okada et al. | |
| 2018/0071860 | A1 | 3/2018 | Odakura et al. | |
| 2018/0221986 | A1 | 8/2018 | Odakura et al. | |

FOREIGN PATENT DOCUMENTS

| | | |
|---|---|---|
| CN | 103658966 A | 3/2014 |
| CN | 107107253 A | 8/2017 |
| CN | 107427957 A | 12/2017 |
| EP | 0 929 375 B1 | 11/2002 |
| JP | 11-226758 A | 8/1999 |
| JP | 2005-199337 A | 7/2005 |
| JP | 4382504 B2 | 12/2009 |
| JP | 5883978 B1 | 3/2016 |
| KR | 10-2011-0132358 A | 12/2011 |
| KR | 10-2017-0127008 A | 11/2017 |
| WO | WO 2016/163481 A1 | 10/2016 |

OTHER PUBLICATIONS

Chinese-language Office Action issued in Chinese Application No. 201980040991.7 dated Sep. 28, 2021 with partial English translation (eight (8) pages).
International Search Report (PCT/ISA/210) issued in PCT Application No. PCT/JP2019/036313 dated Nov. 26, 2019 with English translation (five (5) pages).
Japanese-language Written Opinion (PCT/ISA/237) issued in PCT Application No. PCT/JP2019/036313 dated Nov. 26, 2019 (five (5) pages).
Extended European Search Report issued in European Application No. 19861518.9 dated May 16, 2022 (seven (7) pages).

* cited by examiner

[FIG. 1]
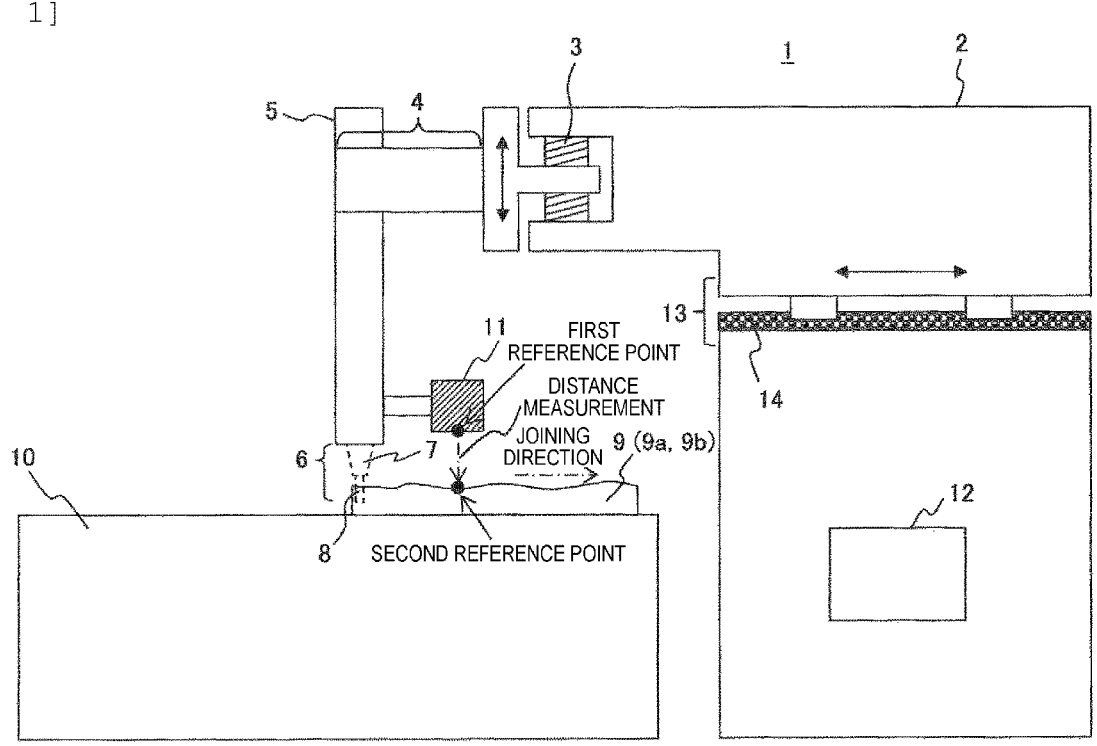
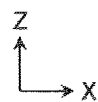

[FIG. 2]
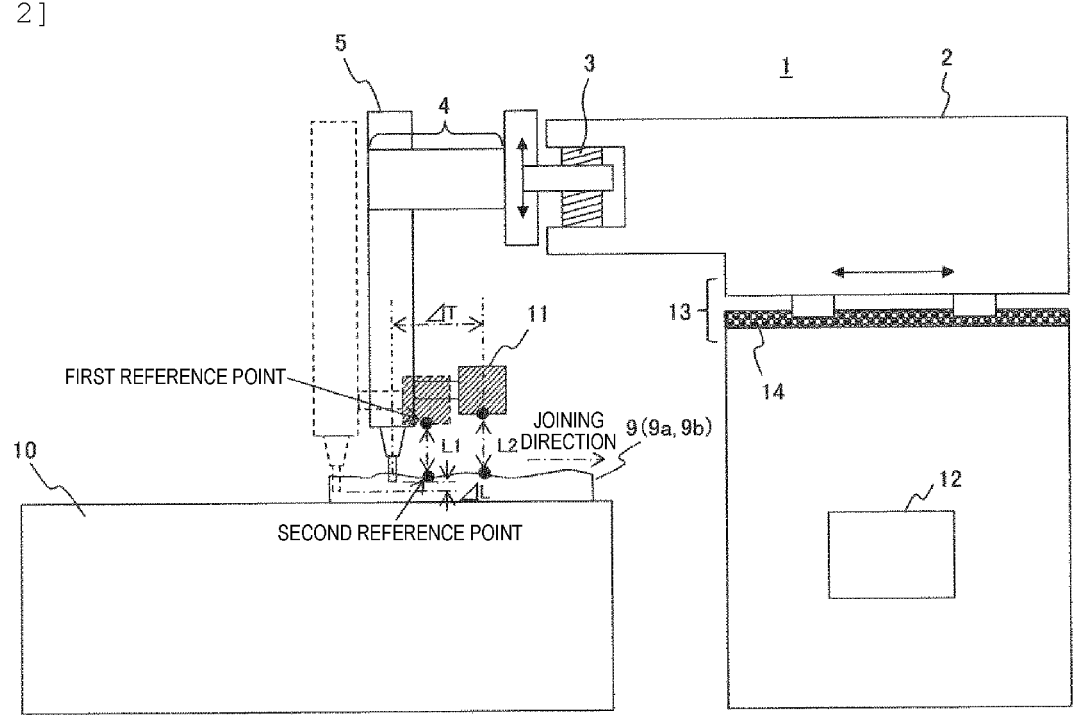

[FIG. 3]
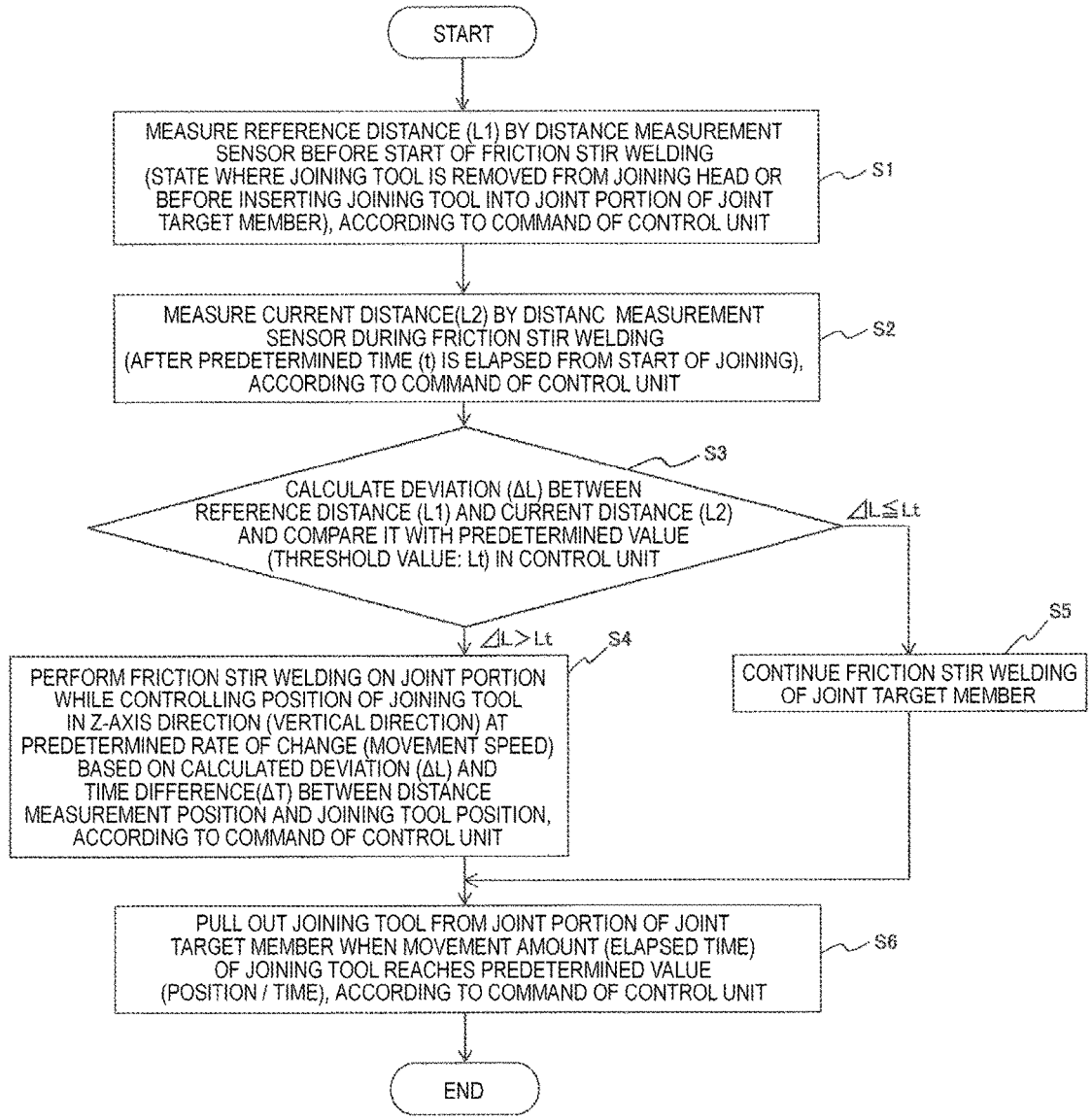

[FIG. 4]
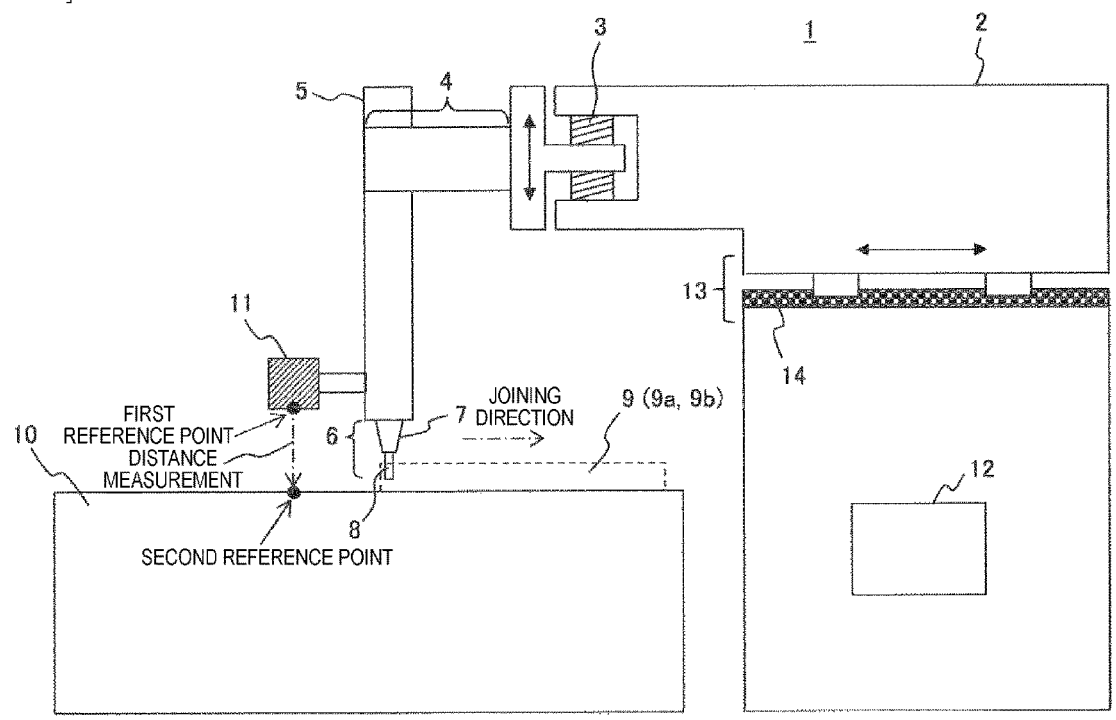

[FIG. 5]
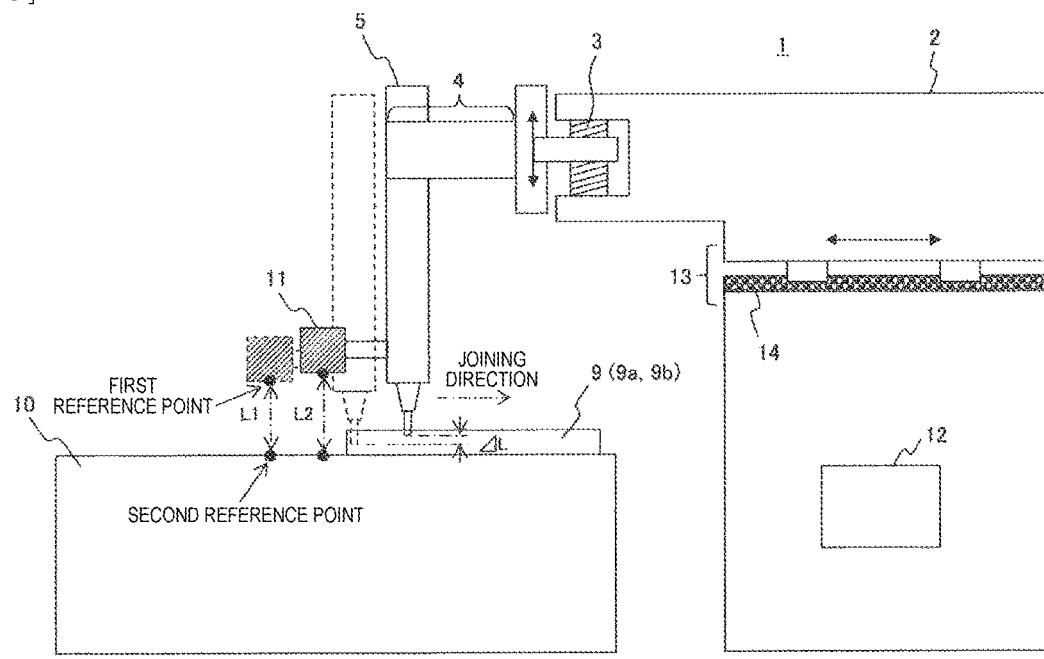

[FIG. 6]
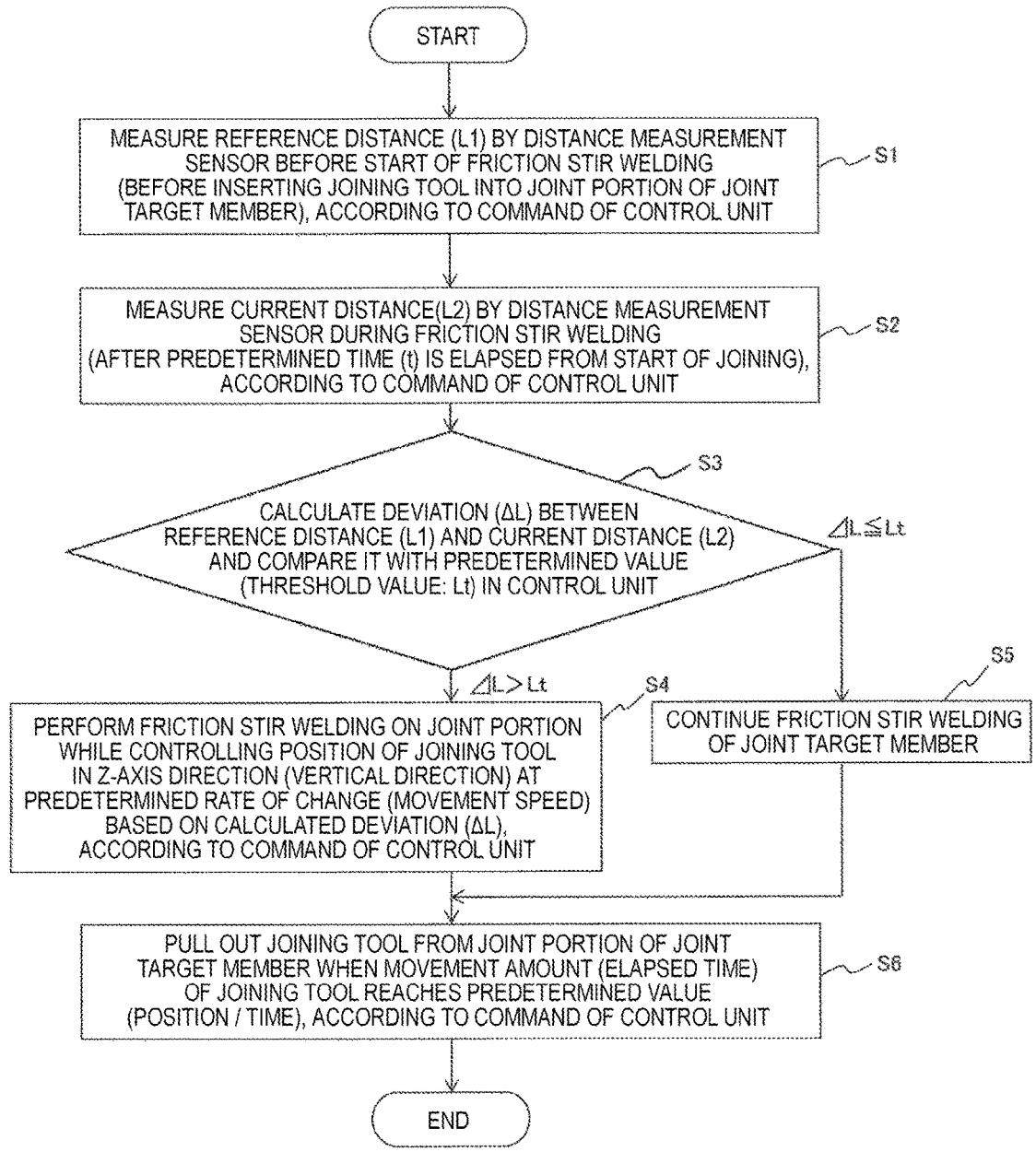

[FIG. 7]
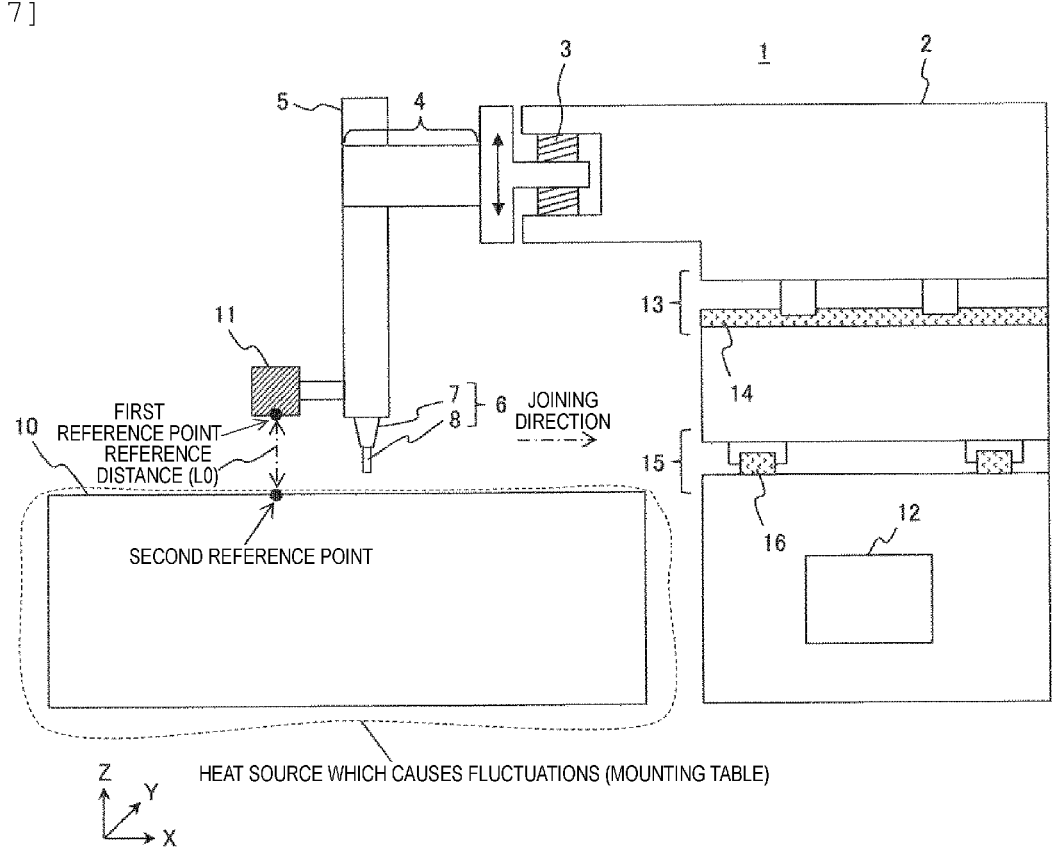

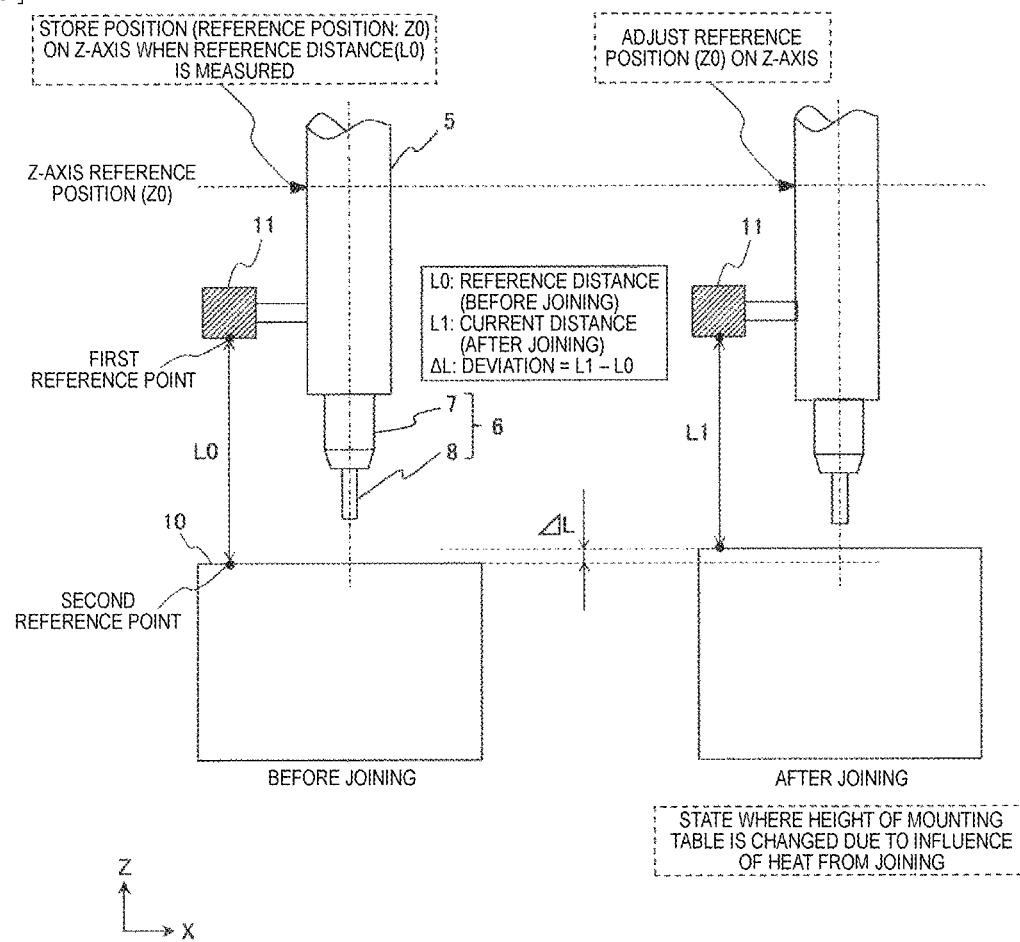
[FIG. 8]

[FIG. 9]
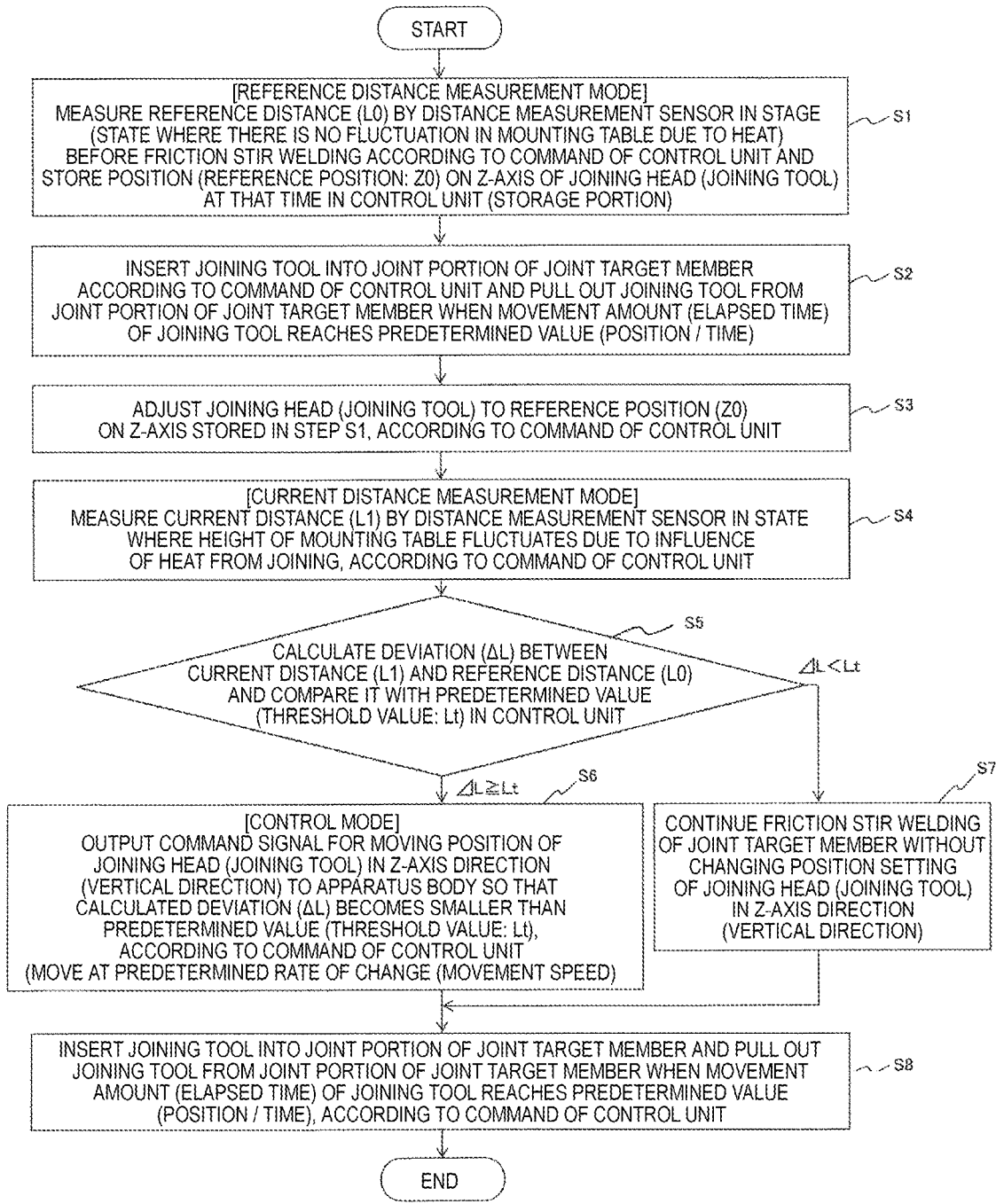

[FIG. 10]
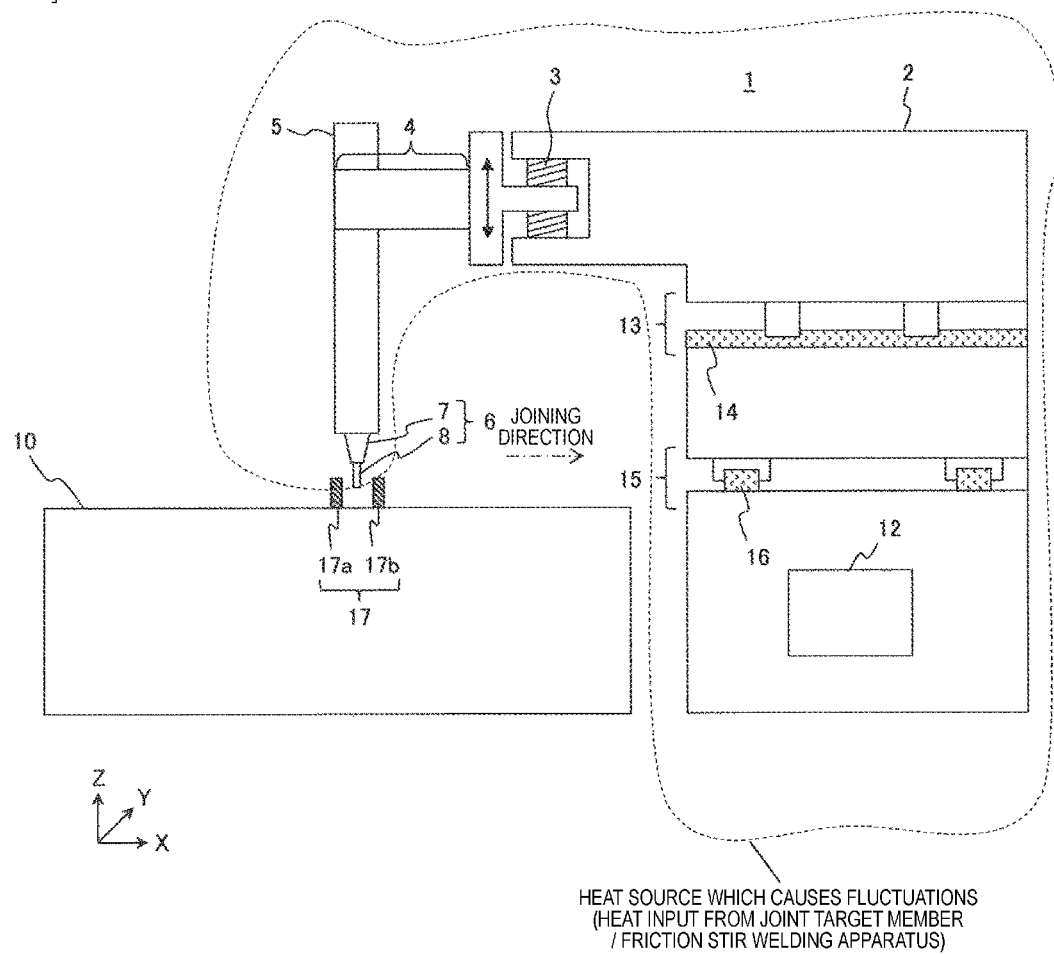
HEAT SOURCE WHICH CAUSES FLUCTUATIONS
(HEAT INPUT FROM JOINT TARGET MEMBER
/ FRICTION STIR WELDING APPARATUS)

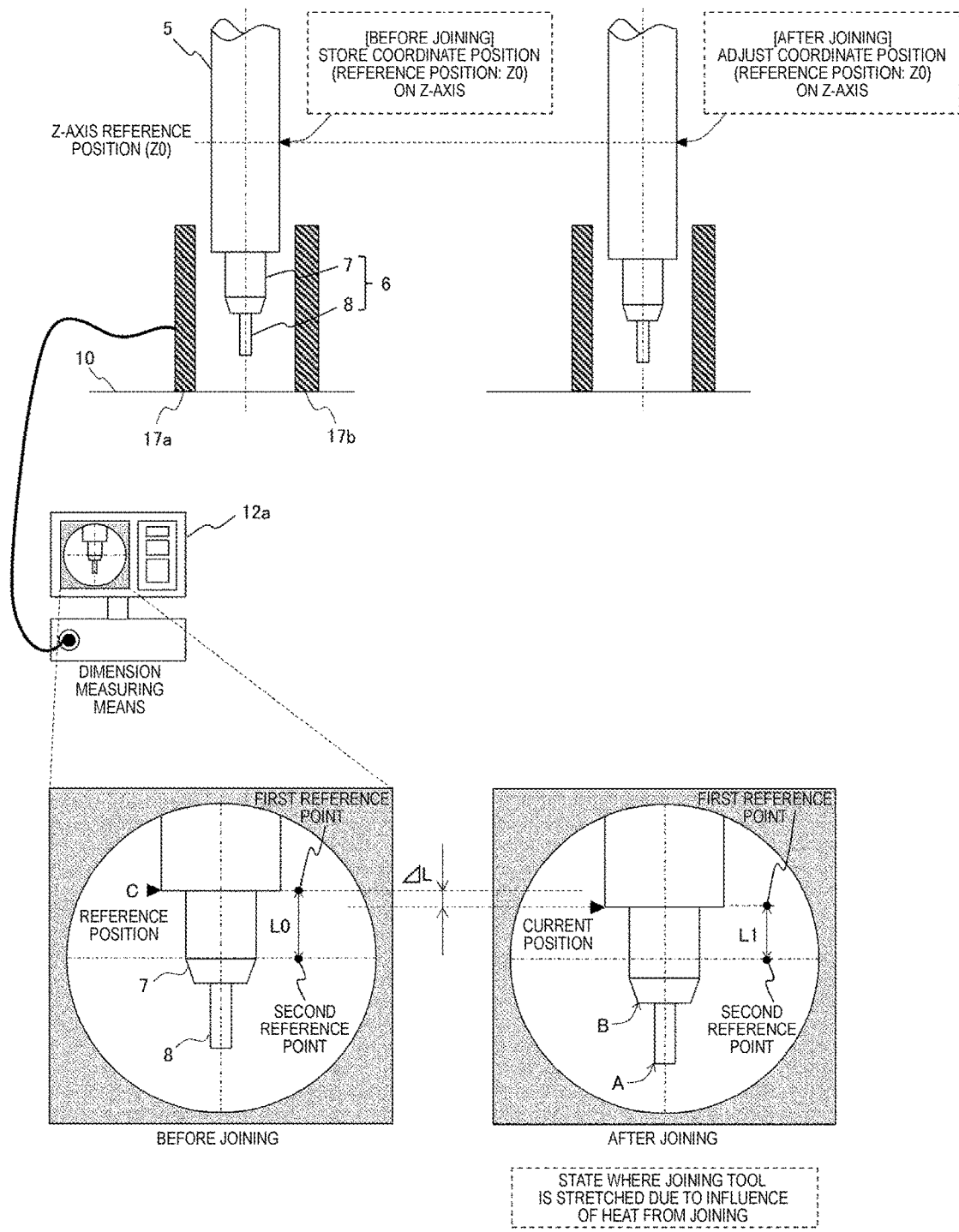

[FIG. 12]
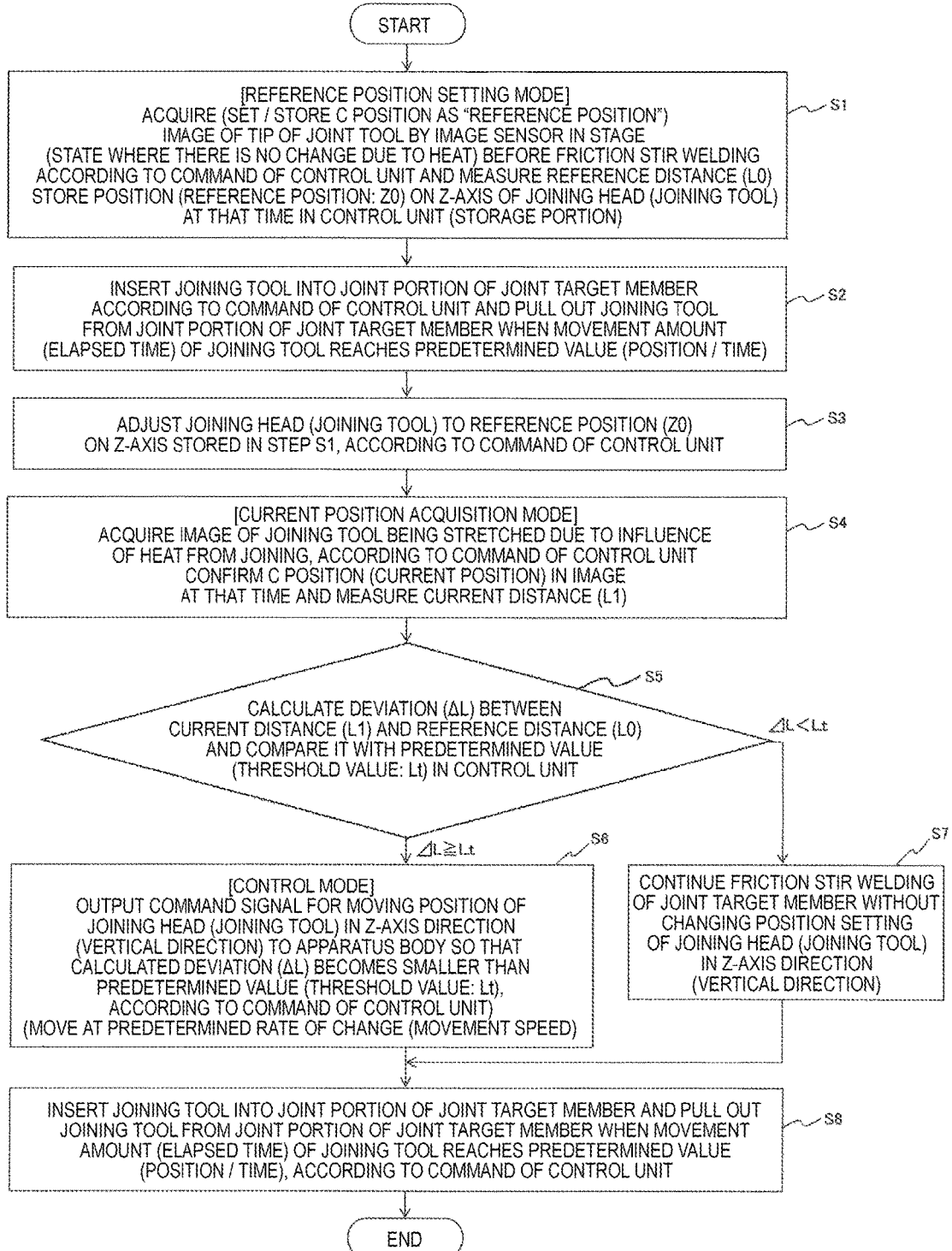

FRICTION STIR WELDING APPARATUS

TECHNICAL FIELD

The present invention relates to a friction stir welding apparatus and a friction stir welding method for joining joint target members by friction stir welding, and particularly relates to a technique which is effective when applied to joining joint target members which require high quality (high precision) joining.

BACKGROUND ART

Friction stir welding (FSW) which joins joint target materials by softening the joint target materials by frictional heat generated by rotating a columnar joining tool and stirring that part does not use any material other than the material. Therefore, the fatigue strength is high, and the material does not melt, so it is possible to join with less welding deformation (strain). As a result, it is expected to be applied in a wide range of fields such as bodies of aircraft and automobiles.

As a background technique in this technical field, for example, there is a technique such as PTL 1. PTL 1 discloses a "technique where joining conditions (Z-axis position of joining head, rotation speed, traveling speed) are set before inserting a joining tool into a joint target member, and after inserting the joining tool into the joint target member and starting friction stir welding, the rotation speed and/or the traveling speed is controlled so that a joining temperature near a joining site is kept substantially constant".

CITATION LIST

Patent Literature

PTL 1: Japanese Patent No. 5883978

SUMMARY OF INVENTION

Technical Problem

In PTL 1 described above, in order to keep a joining temperature substantially constant, a rotation speed and an advancing speed are controlled in real time after starting friction stir welding. However, of the joining conditions, there is no control over a position of a joining head in a Z-axis direction.

However, as a result of diligent research, in order to realize higher quality (high precision) joining, the inventors of the present application have found that it is necessary to correct the position of the joining head in the Z-axis direction during the joining depending on the joining conditions.

Further, in the FSW apparatus (friction stir welding apparatus) of the related art as in PTL 1, by predicting deflection in the Z-axis direction (upward direction) in advance for each joining process (process of inserting a joining tool into a joint target member, performing friction stir welding to the end of the joint target member, and returning the joining tool to an origin position), incorporating a correction value to eliminate that value, and setting a position of the joining head in the Z-axis direction, it copes with the deflection of the joining head in the Z-axis direction (upward direction) which occurs during joining.

However, such a method of the related art can cope with a long required tact time of a production line, but cannot sufficiently cope with a short required tact time.

Therefore, an object of the invention is to provide a friction stir welding apparatus and a friction stir welding method capable of highly accurate position control in a Z-axis direction (vertical direction) of a joining tool when a joint target member is subjected to friction stir welding by the friction stir welding apparatus.

Solution to Problem

In order to solve the problem described above, according to the invention, there is provided a friction stir welding apparatus which includes a joining tool which consists of a shoulder portion and a probe portion and is inserted into a joint target member to rotate, a joining head which holds the joining tool, an apparatus body which holds the joining head, rotates the joining tool, and moves the joining tool, and a control device which controls an operation of the joining tool, in which the control device has a reference setting mode where a correction reference used for correction of misalignment in a Z-axis direction of the joining tool which occurs when the joint target member is joined by the joining tool is set in a stage before the joining tool is inserted into the joint target member, a joining mode where the joining tool is inserted into the joint target member and the joint target member is joined, and a correction mode where an amount of position fluctuation of a tip of the joining tool with respect to the correction reference which occurs when the joining tool joins the joint target member is measured and correction is performed when the amount of position fluctuation exceeds a predetermined threshold value.

Advantageous Effects of Invention

According to the invention, when using an FSW apparatus (friction stir welding apparatus) in a production line having a short required tact time, even when a joining tool bends in a Z-axis direction (upward direction) due to a reaction force, it is possible to accurately correct a position of the joining tool in the Z-axis direction (upward direction).

That is, it is possible to realize a friction stir welding apparatus and a friction stir welding method capable of high-quality (high-precision) joining of joint target members even on a production line with a short required tact time.

Issues, configurations, and effects other than those described above will be clarified by the description of the following embodiments.

BRIEF DESCRIPTION OF DRAWINGS

FIG. 1 is a diagram illustrating an overall outline of a friction stir welding apparatus according to an embodiment of the invention.

FIG. 2 is a diagram illustrating an overall outline of the friction stir welding apparatus according to the embodiment of the invention.

FIG. 3 is a flowchart illustrating a friction stir welding method according to the embodiment of the invention.

FIG. 4 is a diagram illustrating an overall outline of a friction stir welding apparatus according to another embodiment of the invention.

FIG. 5 is a diagram illustrating an overall outline of the friction stir welding apparatus according to the embodiment of the invention.

FIG. 6 is a flowchart illustrating a friction stir welding method according to the embodiment of the invention.

FIG. 7 is a diagram illustrating an overall outline of a friction stir welding apparatus according to still another embodiment of the invention.

FIG. 8 is a diagram conceptually illustrating an operation (action) of the friction stir welding apparatus according to the embodiment of the invention.

FIG. 9 is a flowchart illustrating a friction stir welding method according to the embodiment of the invention.

FIG. 10 is a diagram illustrating an overall outline of a friction stir welding apparatus according to still another embodiment of the invention.

FIG. 11 is a diagram conceptually illustrating an operation (action) of the friction stir welding apparatus according to the embodiment of the invention.

FIG. 12 is a flowchart illustrating a friction stir welding method according to the embodiment of the invention.

DESCRIPTION OF EMBODIMENTS

Hereinafter, examples of the invention will be described with reference to the drawings. In each drawing, the same components are designated by the same reference numerals and letters and the detailed description of repeated parts will be omitted.

First Example

A friction stir welding apparatus and a friction stir welding method of a first example will be described with reference to FIGS. 1 to 3. FIGS. 1 and 2 are diagrams illustrating an overall outline of a friction stir welding apparatus 1 of this example. FIG. 1 illustrates a state before (that is, before the start of joining) a joining tool portion 6 is inserted into a joint target member 9 (9a, 9b) and FIG. 2 illustrates a state during joining in which the joining tool portion 6 is inserted into the joint target member 9 (9a, 9b) and friction stir welding is performed. FIG. 3 is a flowchart illustrating a typical friction stir welding method (control method) according to the example.

FIG. 1 illustrates a state in which a reference distance (L1) is measured in a "measurement mode" described below. Actually, the "measurement mode" is often executed with the joining tool portion 6 removed from a holder portion (joining head) 5, so the joining tool portion 6 (shoulder portion 7 and probe portion (joining pin) 8) is illustrated by a dotted line in FIG. 1.

As illustrated in FIG. 1, the friction stir welding apparatus 1 of the example includes, as main components, an apparatus body 2, a holder portion (joining head) holding portion 4, which is connected to the apparatus body 2 via a vertical movement drive mechanism unit 3, the holder portion (joining head) 5, which is connected (held) to the holder portion (joining head) holding portion 4, and the joining tool portion 6 which is held by the holder portion (joining head) 5. As illustrated in FIG. 1, a ball screw or the like is used for the vertical movement drive mechanism unit 3. The joining tool portion 6 is composed of the shoulder portion 7 and the probe portion (joining pin) 8 and the probe portion (joining pin) 8 is held by the holder portion (joining head) 5 via the shoulder portion 7. The apparatus body 2 holds the holder portion (joining head) 5, rotates the joining tool portion 6, and moves the joining tool portion 6 in an X-axis direction and a Z-axis direction in FIG. 1.

This probe portion (joining pin) 8 is inserted into an abutting portion of the joint target member 9 (9a, 9b) placed on a mounting table 10 and frictional heat is generated between the probe portion (joining pin) 8 and the joint target member 9 (9a, 9b) by rotating the probe portion (joining pin) 8 at high speed, and then the frictional heat causes plastic flow in the joint target member 9 (9a, 9b). As a result, the joint portion is stirred. When the probe portion (joining pin) 8 moves, the stirring portion (joint portion) is cooled and the joint target members are joined to each other.

Although, FIG. 1 illustrates a configuration in which the holder portion 5 and the joining tool portion 6 are connected (held) to the apparatus body 2 via the holder portion holding unit 4 and the vertical movement drive mechanism unit 3, it is not limited to this. The scope of the example also includes, for example, a configuration in which the holder portion 5 and the joining tool portion 6 are connected (held) to the apparatus body 2 only through the vertical movement drive mechanism unit 3, a configuration in which the holder portion 5 and the joining tool portion 6 are connected (held) to the apparatus body 2 via other movable means, a configuration in which the holder portion 5 and the joining tool portion 6 are directly connected (held) to the apparatus body 2, a configuration in which, in addition to the configuration illustrated in FIG. 1, a C-shaped frame is further provided between the holder portion 5 and the apparatus body 2, and a configuration in which the holder portion 5 and the joining tool portion 6 are connected (held) to the apparatus body 2 having a multi-axis robot arm.

A distance measurement sensor 11 is provided in the holder portion (joining head) 5. The distance measurement sensor 11 is arranged on a traveling direction (joining direction) side of the holder portion (joining head) 5 at the time of joining and measures a distance between a predetermined position (called a first reference point) of the holder portion (joining head) 5 (distance measurement sensor 11) and a predetermined position (called a second reference point) on the joint target member 9 (9a, 9b). The first reference point and the second reference point are arranged (set) at positions facing each other.

For the distance measurement sensor 11, for example, a non-contact type displacement sensor such as a laser displacement sensor using a laser beam is used. Alternatively, a contact-type displacement sensor such as a linear gauge may be used as long as the distance measurement and the friction stir welding process are not affected. When the laser displacement sensor is used, the first reference point is a distance measurement signal irradiation point of the distance measurement sensor 11 as illustrated in FIG. 1.

The apparatus body 2 is provided with a control unit (control device) 12 which controls the operation of the friction stir welding apparatus 1. The control unit (control device) 12 includes a storage portion (not illustrated) which stores joining parameters (FSW joining conditions) such as a joining condition signal which determines the joining condition by the joining tool portion 6 and a holding position determination signal which determines a holding position (insertion amount of joining pin 8) in a height direction (Z direction) of the joining tool portion 6 by the vertical movement drive mechanism unit 3.

Further, the apparatus body 2 is provided with a linear drive mechanism unit 13 which can be driven in the X-axis direction, and by moving the upper part of the apparatus body 2 along a rail 14 of the linear guide provided in the X-axis direction, the holder portion (joining head) 5 can be moved in the X-axis direction (joining direction).

A typical friction stir welding method (control method) using the distance measurement sensor 11 described above will be described with reference to FIGS. 2 and 3.

First, according to a command from the control unit (control device) 12, the distance measurement sensor 11 measures the reference distance (L1), which is a distance between the first reference point and the second reference point, before (as illustrated in FIG. 1, a state where the joining tool portion 6 is removed from the holder portion (joining head) 5, or before inserting the joining tool portion 6 into the joint portion of the joint target member 9 (9a, 9b)) the start of friction stir welding (Step S1). Here, this Step S1 is referred to as the "measurement mode".

That is, the control unit (control device) 12 has the "measurement mode" in which, in a stage before the joining tool portion 6 (probe portion 8) is inserted into the joint target member 9 (9a, 9b), a tip position of the joining tool portion 6 (probe portion 8) is lowered to a position in the Z-axis direction at the time of joining to perform alignment and the reference distance (L1), which is the distance between the first reference point and the second reference point, is acquired from the distance measurement sensor 11 without joining the joint target member 9 (9a, 9b).

In this "measurement mode", by moving the holder portion (joining head) 5 in the joining direction, the reference distance is acquired continuously or at predetermined intervals (predetermined distance interval or predetermined time interval) by moving the first reference point and the second reference point from a joining start position to a joining end position on the joint target member 9 (9a, 9b).

Next, according to a command from the control unit (control device) 12, during the friction stir welding (after a predetermined time (t) has elapsed from the start of joining), the distance measurement sensor 11 measures a current distance (L2), which is a distance between the first reference point and the second reference point (Step S2).

During friction stir welding, "burrs" are generated near a boundary between the joining tool portion 6 (probe portion 8) and the joint target member 9 (9a, 9b). Thus, it is preferable to dispose the distance measurement sensor 11 at a position where the current distance (L2) can be measured while avoiding the "burr".

Subsequently, in the control unit (control device) 12, a deviation ($\Delta$L) between the reference distance (L1) measured in Step S1 and the current distance (L2) measured in Step S2 is calculated and compared with a predetermined value (threshold value: Lt) set in advance (Step S3). This deviation ($\Delta$L) is the amount of deflection of the joining tool portion 6 at the time of friction stir welding.

When the deviation ($\Delta$L) between the reference distance (L1) and the current distance (L2) exceeds the threshold value (Lt) ($\Delta$L>Lt), while controlling the position of the joining tool portion 6 in the Z-axis direction (vertical direction) at a predetermined rate of change (moving speed) by the command of the control unit (control device) 12 based on the calculated deviation ($\Delta$L) and a time difference ($\Delta$T) between the distance measurement position and the joining tool position, the joint target member 9 (9a, 9b) is subjected to friction stir welding (Step S4).

Here, this Step S4 is referred to as a "control mode". In this "control mode", when the deviation ($\Delta$L) calculated in Step S3 exceeds the predetermined value (threshold value: Lt), the control unit (control device) 12 generates a change position signal of the holder portion (joining head) 5 which corrects the amount of the deviation ($\Delta$L) in a direction opposite to the direction in which the deviation ($\Delta$L) occurs in the Z-axis direction and outputs the signal to the apparatus body 2.

That is, the control unit (control device) 12 has the "control mode" in which, after the joining tool portion 6 is inserted into the joint target member 9 (9a, 9b), the current distance, which is the distance between the first reference point and the second reference point on the joint target member 9 (9a, 9b), is obtained from the distance measurement sensor 11 and the deviation between the acquired current distance and the corresponding reference distance is calculated, and then, when the calculated deviation exceeds the predetermined value, the change position signal of the holder portion (joining head) 5 which corrects the deviation in the direction opposite to the direction in which the deviation occurs in the Z-axis direction is generated and the signal is output to the apparatus body 2.

This change position signal, for example, moves the holder portion (joining head) 5 by a predetermined distance per unit time and is continuously output to the apparatus body 2 until the current distance (L2) or the deviation ($\Delta$L) reaches within a predetermined value range. Based on the change position signal obtained from the control unit (control device) 12, the apparatus body 2 sets the position of the holder portion (joining head) 5 in the Z-axis direction and moves the holder portion (joining head) 5 at a predetermined rate of change (movement speed).

This "control mode" may be continuously performed during friction stir welding, or may be controlled so as to be repeated intermittently at predetermined time intervals.

Further, the predetermined time interval for repeating the "control mode" is determined in advance based on the characteristics of the joint target member 9 (9a, 9b) and it is also possible to select a value corresponding to the characteristic of the joint target member 9 (9a, 9b) from a characteristic table storing the predetermined time interval corresponding to the characteristic of the joint target member 9 (9a, 9b).

Further, in the "control mode", a "control stop mode" for stopping the control mode after outputting the change position signal based on the deviation ($\Delta$L) may be set to perform intermittent control.

As illustrated in FIG. 2, since the distance measurement position (measurement position of current distance (L2)) and the position of the joining tool portion 6 are different, it is necessary to delay and control the time difference ($\Delta$T) of the difference (amount of distance) of those positions. Therefore, in Step S4, in addition to the deviation ($\Delta$L) calculated in Step S3, control is performed in consideration of the time difference ($\Delta$T) of the difference (amount of distance) between the distance measurement position (measurement position of current distance (L2)) and the position of the joining tool portion 6.

That is, since the distance measurement sensor 11 and the joining tool portion 6 are separated by a fixed distance (certain distance) and there is a time difference ($\Delta$T) for the amount of the fixed distance (certain distance) until the joining tool portion 6 reaches the point measured by the preceding distance measurement sensor 11, the control timing is adjusted by the speed and distance in the X-axis direction.

The time difference ($\Delta$T) is calculated by time (T)=distance (L)/speed (V). Here, the speed (V) is the speed (constant speed) at the time of joining several m/min and the distance (L) is the distance (fixed distance) between the centers of the joining tool portion 6 and the distance measurement sensor 11.

On the other hand, when the deviation ($\Delta$L) between the reference distance (L1) and the current distance (L2) is equal to or less than the threshold value (Lt) ($\Delta$L$\leq$Lt), the friction stir welding of the joint target member 9 (9a, 9b) is continued while maintaining the joining conditions when the current distance (L2) is measured without controlling the position of the joining tool portion 6 in the Z-axis direction (Step S5).

After that, according to the command from control unit (control device) 12, when the movement amount (elapsed time) of the joining tool portion 6 reaches a predetermined value (position/time), the joining tool portion 6 is pulled out from the joint portion of the joint target member 9 (9a, 9b) and the friction stir welding process is completed (Step S6).

As described above, according to the friction stir welding apparatus and the friction stir welding method of this example, the distance (reference distance: L1) between the predetermined position (first reference point) of the holder portion (joining head) 5 (distance measurement sensor 11) and the predetermined position (second reference point) on the joint target member 9 (9a, 9b) before the start of friction stir welding is measured and the distance (current distance: L2) between the first reference point and the second reference point is measured again during friction stir welding (after a predetermined time (t) has elapsed from the start of joining), and then the position of the joining tool portion 6 in the Z-axis direction (vertical direction) is corrected so that the deviation ΔL (L2−L1) is within a predetermined range, in such a manner that it is possible to correct the deflection caused by the pressing of the joining tool portion 6.

This makes it possible to join the joint target members with high quality (high accuracy) even on a production line with a short required tact time.

In Step S6 of FIG. 3, by performing so-called "line joining" in which friction stir welding starts from one end of the joint target member 9 (9a, 9b) and friction stir welding is continuously performed to the other end of the joint target member 9 (9a, 9b), the quality (reliability) of the joint can be further improved.

Second Example

A friction stir welding apparatus and a friction stir welding method of a second example will be described with reference to FIGS. 4 to 6. FIGS. 4 and 5 are diagrams illustrating an overall outline of a friction stir welding apparatus 1 of this example. FIG. 4 illustrates a state before (that is, before the start of joining) a joining tool portion 6 is inserted into a joint target member 9 (9a, 9b) and FIG. 5 illustrates a state during joining in which the joining tool portion 6 is inserted into the joint target member 9 (9a, 9b) and friction stir welding is performed. FIG. 6 is a flowchart illustrating a typical friction stir welding method (control method) according to the example.

FIG. 4 illustrates a state in which a reference distance (L1) is measured in a "measurement mode" described below. Actually, the "measurement mode" is often executed without the joint target member 9 (9a, 9b) mounted on a mounting table 10, so that the joint target member 9 (9a, 9b) is illustrated by the dotted line.

In the friction stir welding apparatus 1 of this example, a distance measurement sensor 11 is provided in the holder portion (joining head) 5, as illustrated in FIG. 4. The distance measurement sensor 11 is arranged on a side opposite to a traveling direction (joining direction) of the holder portion (joining head) at the time of joining and measures a distance between a predetermined position (called a first reference point) of the holder portion (joining head) 5 (distance measurement sensor 11) and a predetermined position (called a second reference point) on the mounting table 10 on which the joint target member 9 (9a, 9b) is placed. The first reference point and the second reference point are arranged (set) at positions facing each other.

For the distance measurement sensor 11, for example, a non-contact type displacement sensor such as a laser displacement sensor using a laser beam is used. Alternatively, a contact-type displacement sensor such as a linear gauge may be used as long as the distance measurement and the friction stir welding process are not affected. When the laser displacement sensor is used, the first reference point is a distance measurement signal irradiation point of the distance measurement sensor 11 as illustrated in FIG. 4.

The apparatus body 2 is provided with a control unit (control device) 12 which controls the operation of the friction stir welding apparatus 1. The control unit (control device) 12 includes a storage portion (not illustrated) which stores joining parameters (FSW joining conditions) such as a joining condition signal which determines the joining condition by the joining tool portion 6 and a holding position determination signal which determines a holding position (insertion amount of joining pin 8) in a height direction (Z direction) of the joining tool portion 6 by the vertical movement drive mechanism unit 3.

Further, the apparatus body 2 is provided with a linear drive mechanism unit 13 which can be driven in the X-axis direction, and by moving the upper part of the apparatus body 2 along a rail 14 of the linear guide provided in the X-axis direction, the holder portion (joining head) 5 can be moved in the X-axis direction (joining direction).

A typical friction stir welding method (control method) using the distance measurement sensor 11 described above will be described with reference to FIGS. 5 and 6.

First, according to a command from the control unit (control device) 12, the distance measurement sensor 11 measures the reference distance (L1), which is a distance between the first reference point and the second reference point, before (before inserting the joining tool portion 6 into the joint portion of the joint target member 9 (9a, 9b)) the start of friction stir welding (Step S1). Here, this Step S1 is referred to as the "measurement mode".

That is, the control unit (control device) 12 has the "measurement mode" in which, in a stage before the joining tool portion 6 (probe portion 8) is inserted into the joint target member 9 (9a, 9b), a tip position of the joining tool portion 6 (probe portion 8) is lowered to a position in the Z-axis direction at the time of joining to perform alignment and the reference distance (L1), which is the distance between the first reference point and the second reference point on the mounting table 10, is acquired from the distance measurement sensor 11.

Next, according to a command from the control unit (control device) 12, during the friction stir welding (after a predetermined time (t) has elapsed from the start of joining), the distance measurement sensor 11 measures a current distance (L2), which is a distance between the first reference point and the second reference point (Step S2).

Subsequently, in the control unit (control device) 12, a deviation (ΔL) between the reference distance (L1) measured in Step S1 and the current distance (L2) measured in Step S2 is calculated and compared with a predetermined value (threshold value: Lt) set in advance (Step S3). This deviation (ΔL) is the amount of deflection of the joining tool portion 6 at the time of friction stir welding.

When the deviation (ΔL) between the reference distance (L1) and the current distance (L2) exceeds the threshold value (Lt) (ΔL>Lt), while controlling the position of the joining tool portion 6 in the Z-axis direction (vertical direction) at a predetermined rate of change (moving speed) by the command of the control unit (control device) 12 based on the calculated deviation (ΔL), the joint target member 9 (9a, 9b) is subjected to friction stir welding (Step S4).

Here, this Step S4 is referred to as a "control mode". In this "control mode", when the deviation (ΔL) calculated in Step S3 exceeds the predetermined value (threshold value: Lt), the control unit (control device) 12 generates a change position signal of the holder portion (joining head) 5 which corrects the amount of the deviation (ΔL) in a direction opposite to the direction in which the deviation (ΔL) occurs in the Z-axis direction and outputs the signal to the apparatus body 2.

This change position signal, for example, moves the holder portion (joining head) 5 by a predetermined distance per unit time and is continuously output to the apparatus body 2 until the current distance (L2) or the deviation (ΔL) reaches within a predetermined value range. Based on the change position signal obtained from the control unit (control device) 12, the apparatus body 2 sets the position of the holder portion (joining head) 5 in the Z-axis direction and moves the holder portion (joining head) 5 at a predetermined rate of change (movement speed).

This "control mode" may be continuously performed during friction stir welding, or may be controlled so as to be repeated intermittently at predetermined time intervals.

Further, the predetermined time interval for repeating the "control mode" is determined in advance based on the characteristics of the joint target member 9 (9a, 9b) and it is also possible to select a value corresponding to the characteristic of the joint target member 9 (9a, 9b) from a characteristic table storing the predetermined time interval corresponding to the characteristic of the joint target member 9 (9a, 9b).

Further, in the "control mode", a "control stop mode" for stopping the control mode after outputting the change position signal based on the deviation (ΔL) may be set to perform intermittent control.

On the other hand, when the deviation (ΔL) between the reference distance (L1) and the current distance (L2) is equal to or less than the threshold value (Lt) (ΔL≤Lt), the friction stir welding of the joint target member 9 (9a, 9b) is continued while maintaining the joining conditions when the current distance (L2) is measured without controlling the position of the joining tool portion 6 in the Z-axis direction (vertical direction) (Step S5).

After that, according to the command from control unit (control device) 12, when the movement amount (elapsed time) of the joining tool portion 6 reaches a predetermined value (position/time), the joining tool portion 6 is pulled out from the joint portion of the joint target member 9 (9a, 9b) and the friction stir welding process is completed (Step S6).

As described above, according to the friction stir welding apparatus and the friction stir welding method of this example, the distance (reference distance: L1) between the predetermined position (first reference point) of the holder portion (joining head) 5 (distance measurement sensor 11) and the predetermined position (second reference point) of the mounting table 10 on which the joint target member 9 (9a, 9b) is placed before the start of friction stir welding is measured and the distance (current distance: L2) between the first reference point and the second reference point is measured again during friction stir welding (after a predetermined time (t) has elapsed from the start of joining), and then the position of the joining tool portion 6 in the Z-axis direction (vertical direction) is corrected so that the deviation ΔL (L2−L1) is within a predetermined range, in such a manner that it is possible to correct the deflection caused by the pressing of the joining tool portion 6.

This makes it possible to join the joint target members with high quality (high accuracy) even on a production line with a short required tact time.

In Step S6 of FIG. 6, by performing so-called "line joining" in which friction stir welding starts from one end of the joint target member 9 (9a, 9b) and friction stir welding is continuously performed to the other end of the joint target member 9 (9a, 9b), the quality (reliability) of the joint can be further improved.

Third Example

A friction stir welding apparatus and a friction stir welding method of a third example of the invention will be described with reference to FIGS. 7 to 9. FIG. 7 is a diagram illustrating an overall outline of a friction stir welding apparatus 1 of this example and FIG. 8 is a diagram conceptually illustrating an operation (action) thereof. FIG. 9 is a flowchart illustrating a typical friction stir welding method (control method) according to this example.

In the friction stir welding apparatus 1 of the example, a distance measurement sensor 11 is provided in a holder portion (joining head) 5, as illustrated in FIG. 7. The distance measurement sensor 11 is arranged on a side opposite to a traveling direction (joining direction) of the holder portion (joining head) at the time of joining and measures a distance between a predetermined position (called a first reference point) of the holder portion (joining head) 5 (distance measurement sensor 11) and a predetermined position (called a second reference point) on a mounting table 10 on which the joint target member is placed. The first reference point and the second reference point are arranged (set) at positions facing each other in a vertical direction.

As illustrated in FIG. 7, in a state where the joining tool portion 6 is in an origin position (the position before starting the operation for inserting the joining tool into the joint target member, that is, the position in the pre-joining stage), the distance measurement sensor 11 measures a reference distance (L0), which is the distance between the first reference point and the second reference point. This reference distance (L0) is the origin position in the Z-axis direction (vertical direction) of the holder portion (joining head) 5 when the power is turned on to the apparatus body 2.

For the distance measurement sensor 11, for example, a non-contact type displacement sensor such as a laser displacement sensor using a laser beam is used. Alternatively, a contact-type displacement sensor such as a linear gauge may be used as long as the distance measurement and the friction stir welding process are not affected. When the laser displacement sensor is used, the first reference point is a distance measurement signal irradiation point of the distance measurement sensor 11 as illustrated in FIG. 7 and the second reference point is a distance measurement signal receiving point of the distance measurement sensor 11.

The apparatus body 2 is provided with a control unit (control device) 12 which controls the operation of the friction stir welding apparatus 1. The control unit (control device) 12 includes a storage portion (not illustrated) which stores joining parameters (FSW joining conditions) such as a joining condition signal which determines the joining condition by the joining tool portion 6, a holding position determination signal which determines a holding position (insertion amount of joining pin 8) in a height direction (Z direction) of the joining tool portion 6 by the vertical movement drive mechanism unit 3, and a change position signal of the joining head 5 (joining tool portion 6).

Further, the apparatus body 2 is provided with a linear drive mechanism unit 13 which can be driven in the X-axis direction and a linear drive mechanism unit 15 which can be driven in the Y-axis direction, and by moving the upper part of the apparatus body 2 along a rail 14 of the linear guide provided in the X-axis direction and a rail 16 of the linear guide provided in the Y-axis direction, the holder portion (joining head) 5 can be moved in the X-axis direction (joining direction) and the Y-axis direction (direction orthogonal to the X-axis direction).

As described above, the friction stir welding apparatus 1 of this example includes the joining tool portion 6 which is inserted into the joint target member and progresses while rotating to join the joint target member, the holder portion (joining head) 5 which holds the joining tool portion 6, the apparatus body 2 which holds the holder portion (joining head) 5 and rotates the joining tool portion 6 and advances the joining tool portion 6, and the distance measurement sensor 11 which measures a distance between the first reference point, which is a predetermined position of the holder portion 5, and the second reference point which faces the first reference point in the vertical direction on the mounting table 10 on which the joint target member is placed. It also includes the control unit (control device) 12 which controls the operation of the joining tool portion 6.

A typical friction stir welding method (control method) using the distance measurement sensor 11 described above will be described with reference to FIGS. 8 and 9.

First, according to the command from the control unit (control device) 12, in the stage (a state where there is no fluctuation of the mounting table 10 due to heat) before friction stir welding, the distance measurement sensor 11 measures the reference distance (L0), which is the distance between the predetermined position (first reference point) of the holder portion (joining head) 5 (distance measurement sensor 11) and the predetermined position (second reference point) of the mounting table 10 on which the joint target member is placed and the position (reference position: Z0) on the Z axis of the joining head 5 (joining tool portion 6) at that time is stored in a storage portion of the control unit (control device) 12 (Step S1). Here, the step (operation) of acquiring the reference distance (L0), which is the distance between the first reference point and the second reference point, from the distance measurement sensor 11 before the start of joining (pre-joining stage) is called "reference distance measurement mode".

As described above, in the pre-joining stage, the reference position (Z0) on the Z axis is a position of the device on the Z-axis when the reference distance (L0) is measured and is the position information for specifying the position of the device within a Z-axis movable range of the device. For example, it is preferable that the alignment is automatically performed by Programmable Logic Controller (PLC) control and the repetition accuracy is controlled to about ±0.01 mm.

Next, according to the command from the control unit (control device) 12, the joining tool portion 6 is inserted into the joint portion between a plurality of joint target members, and when the movement amount (elapsed time) of the joining tool portion 6 reaches a predetermined value (position/time), the joining tool portion 6 is pulled out from the joint portion of the joint target member (Step S2). Here, this Step S2 is referred to as a "first joining process".

Subsequently, according to a command from the control unit (control device) 12, the joining head 5 (joining tool portion 6) is aligned with the position (reference position: Z0) on the Z axis stored in Step S1 (Step S3).

Then, according to the command from the control unit (control device) 12, in a state where the height of the mounting table 10 is fluctuated due to the influence of heat from joining, the distance measurement sensor 11 measures the current distance (L1), which is the distance between the predetermined position (first reference point) of the holder portion (joining head) 5 (distance measurement sensor 11) and the predetermined position (second reference point) of the mounting table 10 on which the joint target member is placed (Step S4). Here, this Step S4 is referred to as a "current distance measurement mode".

Then, in the control unit (control device) 12, a deviation ($\Delta L$) between the current distance (L1) measured in Step S4 and the reference distance (L0) measured/stored in Step S1 is calculated and compared with a predetermined value (threshold value: Lt) set in advance (Step S5). This deviation ($\Delta L$) is obtained by $\Delta L$=current distance (L1)−reference distance (L0) and is the amount of fluctuation (stretching amount in the Z-axis direction) of the mounting table 10 which fluctuates due to the influence of heat such as heat input during friction stir welding and an increase in outside air temperature.

When the deviation ($\Delta L$) between the current distance (L1) and the reference distance (L0) reaches the threshold value (Lt) ($\Delta L \geq Lt$), according to the command of the control unit (control device) 12, a command signal for moving the position of the joining head 5 (joining tool portion 6) in the Z-axis direction (vertical direction) is output to the apparatus body 2 so that the calculated deviation ($\Delta L$) becomes smaller than a predetermined value (threshold value: Lt). The apparatus body 2 is set while controlling the position of the joining head 5 (joining tool portion 6) in the Z-axis direction (vertical direction) at a predetermined rate of change (moving speed) (Step S6).

Here, this Step S6 is called "control mode". In this "control mode", the control unit (control device) 12 generates a change position signal (command signal) of the holder portion (joining head) 5 which corrects the amount of the deviation ($\Delta L$) so that the deviation ($\Delta L$) calculated in Step S5 becomes small and outputs the signal to the apparatus body 2.

This change position signal (command signal) moves, for example, the holder portion (joining head) 5 by a predetermined distance per unit time and it is continuously output to the apparatus body 2 until the deviation ($\Delta L$) becomes smaller than the predetermined value (threshold value: Lt). Based on the change position signal (command signal) acquired from the control unit (control device) 12, the apparatus body 2 sets the position of the holder portion (joining head) 5 in the Z-axis direction (vertical direction) and moves the holder portion (joining head) 5 at a predetermined rate of change (movement speed).

On the other hand, when the deviation ($\Delta L$) between the current distance (L1) and the reference distance (L0) is less than the predetermined value (threshold value: Lt) ($\Delta L$<Lt), without setting the position of the joining tool portion 6 in the Z-axis direction (vertical direction), friction stir welding of the joint target member is continued while maintaining the joining conditions when the current distance (L1) is measured (Step S7).

After that, according to the command from the control unit (control device) 12, when the moving amount (elapsed time) of the joining tool portion 6 reaches a predetermined value (position/time), the joining tool portion 6 is pulled out from the joint portion of the joint target member and the friction stir welding process is completed (Step S8).

As described above, the friction stir welding method of this example includes a reference distance measurement step of measuring the reference distance (L0) between the first reference point, which is a predetermined position of the holder portion (joining head) 5 and the second reference point, which is vertically opposed to the first reference point on the mounting table 10 on which the joint target member is placed, in a state where the apparatus body 2 is turned on and the pre-joining stage before joining the joint target member, a current distance measurement step of measuring the current distance (L1) between the first reference point and the second reference point after performing the reference distance measurement step and after friction stir welding the joint target member with the joining tool portion 6, and a position correction step of correcting the vertical position of the holder portion (joining head) 5 so that the deviation (ΔL) is smaller than the predetermined threshold value (Lt) when the deviation (ΔL) between the reference distance (L0) and the current distance (L1) reaches the predetermined threshold value (Lt).

As described above, according to the friction stir welding apparatus and the friction stir welding method of this example, before the start of joining (pre-joining stage), the reference distance (L0), which is the distance between the first reference point and the second reference point, is measured and the current distance (L1), which is the distance between the first reference point and the second reference point, is measured after friction stir welding in a state where the height of the mounting table 10 fluctuates due to the influence of heat from the joining, and then the position of the holder portion (joining head) 5 (joining tool portion 6) in the Z-axis direction (vertical direction) is set so as to make the deviation (ΔL) between the current distance (L1) and the reference distance (L0) smaller than the predetermined threshold value (within the predetermined range), in such a manner that the amount of fluctuation (displacement amount) of the mounting table 10 which is fluctuated (displaced) due to the influence of heat can be corrected.

This enables highly accurate position setting in the Z-axis direction (vertical direction) of the joining tool and enables high-quality (high-precision) joining between the joint target members.

By alternately repeating the above-described "current distance measurement mode" and "control mode", higher quality (high accuracy) joining can be performed.

In Step S2 and Step S8 of FIG. 9, by performing so-called "line joining" in which friction stir welding starts from one end of the joint target member and friction stir welding is continuously performed to the other end of the joint target member, the quality (reliability) of the joint can be further improved.

Further, in FIGS. 7 and 8, an example is illustrated in which the distance measurement sensor 11 is arranged on the side opposite to the traveling direction (joining direction) of the holder portion (joining head) 5 at the time of joining. However, the distance measurement sensor 11 may be arranged on the traveling direction (joining direction) side of the holder portion (joining head) 5 at the time of joining.

Further, by the friction stir welding apparatus and the friction stir welding method of this example, the initial position of the joining tool in the Z-axis direction (vertical direction) can be set accurately in the joining condition setting stage, which is the stage before inserting the joining tool into the joint target member. Thus, by applying the invention to a multi-station type friction stir welding apparatus having a plurality of mounting tables 10, the initial position of the joining tool in the Z-axis direction (vertical direction) can be accurately set for each mounting table 10. As a result, high quality (high precision) joining can be performed on all mounting tables 10.

Fourth Example

The friction stir welding apparatus and the friction stir welding method of a fourth example of the invention will be described with reference to FIGS. 10 to 12. FIG. 10 is a diagram illustrating an overall outline of a friction stir welding apparatus 1 of this example and FIG. 11 is a diagram conceptually illustrating an operation (action) thereof. FIG. 12 is a flowchart illustrating a typical friction stir welding method (control method) according to this example.

As illustrated in FIG. 10, the friction stir welding apparatus 1 of this example is provided with a tip position measuring unit 17 on a mounting table 10. The tip position measuring unit 17 is consist of a first partition 17a, which is provided with an auxiliary light irradiation device (not illustrated) which irradiates imaging auxiliary light rays and a second partition 17b which is arranged horizontally opposed to the first partition 17a and in which an image sensor (not illustrated), which is image acquisition means for acquiring image information of a joining tool portion 6 obtained by irradiating the imaging auxiliary light rays, is arranged.

An apparatus body 2 is provided with a control unit (control device) 12 which controls an operation of the friction stir welding apparatus 1. The control unit (control device) 12 includes a storage portion (not illustrated) which stores joining parameters (FSW joining conditions) such as a joining condition signal which determines the joining condition by a joining tool portion 6, a holding position determination signal which determines a holding position (insertion amount of joining pin 8) in a height direction (Z direction) of the joining tool portion 6 by a vertical movement drive mechanism unit 3, and a change position signal of the joining head 5 (joining tool portion 6). Further, the control unit (control device) 12 includes an image processing device (dimension measuring means) 12a which processes image information acquired from an image sensor (image acquiring means) arranged in the second partition 17b (see FIG. 11).

Further, the apparatus body 2 is provided with a linear drive mechanism unit 13 which can be driven in an X-axis direction and a linear drive mechanism unit 15 which can be driven in a Y-axis direction, and by moving the upper part of the apparatus body 2 along a rail 14 of the linear guide provided in the X-axis direction and a rail 16 of the linear guide provided in the Y-axis direction, the holder portion (joining head) 5 can be moved in the X-axis direction (joining direction) and the Y-axis direction (direction orthogonal to the X-axis direction).

As described above, the friction stir welding apparatus 1 of this example includes the joining tool portion 6 which is inserted into the joint target member and progresses while rotating to join the joint target member, the holder portion (joining head) 5 which holds the joining tool portion 6, the apparatus body 2 which holds the holder portion (joining head) 5, rotates the joining tool portion 6, and advances the joining tool portion 6, the first partition 17a in which the auxiliary light irradiation device (not illustrated) for irradiating imaging auxiliary light rays is arranged on the mounting table 10 on which the joint target member is placed, and the second partition 17b which is arranged horizontally opposite to the first partition 17a and in which the image sensor (not illustrated), which is image acquisition means for acquiring image information of the joining tool portion 6 obtained by irradiating imaging auxiliary light rays, is arranged. It also includes the control unit (control device) 12 which controls the operation of the joining tool portion 6.

A typical friction stir welding method (control method) using the tip position measuring unit 17 (first partition 17a, second partition 17b) described above will be described with reference to FIGS. 11 and 12.

First, according to a command from the control unit (control device) 12, an image of a tip of the joining tool portion 6 is captured by the image sensor arranged on the second partition 17b in a stage (a state where there is no change due to heat) before friction stir welding. In this case, a C position illustrated in "BEFORE JOINING" in FIG. 11 is set as a "reference position" and stored in the storage portion of the control unit (control device) 12. Further, the reference distance (L0), which is the distance between a "first reference point", which is a predetermined position of the holder portion (joining head) 5, and a "second reference point", which is a predetermined position of a shoulder portion 7, is measured. Further, the position (reference position: Z0) on the Z axis of the holder portion (joining head) 5 (joining tool portion 6) in this case is stored in the storage portion of the control unit (control device) 12 (Step S1).

The "first reference point" is a point on a line extending in a horizontal direction from the reference position C defined in an imaging field of view within the acquired image range and the "second reference point" is a point which is on the center (horizontal axis) of the imaging field of view within the acquired image range and faces the "first reference point" in the vertical direction.

Here, Step S1 in which the "reference position C" is set and stored before the start of joining (pre-joining stage), the reference distance (L0), which is the distance between the "first reference point" and the "second reference point" is measured and stored, and a coordinate position (reference position: Z0) on the Z axis of the holder portion (joining head) 5 (joining tool portion 6) is set and stored is called a "reference position setting mode".

The reference position (Z0) on the Z axis is the position of the device on the Z axis when the reference distance (L0) is measured in the pre-joining stage as described above and is position information for specifying the position of the device within the Z-axis movable range of the device. For example, it is preferable that the alignment is automatically performed by Programmable Logic Controller (PLC) control and the repetition accuracy is controlled to about ±0.01 mm.

Further, the positions A and B of the joining tool portion 6 illustrated in "AFTER JOINING" in FIG. 11 have dimensional changes because they are close to the heat source and are not suitable as reference positions. Therefore, as illustrated in "BEFORE JOINING" in FIG. 11, the position of the predetermined position C excluding the joining pin 8 and the shoulder portion 7 is "set" as the reference position.

Next, according to the command from the control unit (control device) 12, the joining tool portion 6 is inserted into the joint portion between a plurality of joint target members, and when the movement amount (elapsed time) of the joining tool portion 6 reaches a predetermined value (position/time), the joining tool portion 6 is pulled out from the joint portion of the joint target member (Step S2). Here, this Step S2 is referred to as a "first joining process".

Subsequently, according to a command from the control unit (control device) 12, the joining head 5 (joining tool portion 6) is aligned with the position (reference position: Z0) on the Z axis stored in Step S1 (Step S3).

Next, according to a command from the control unit (control device) 12, an image of a state in which the joining tool portion 6 is stretched due to the influence of heat due to friction stir welding is acquired. In addition, the C position (current position) in the image at that time is confirmed and the current distance (L1) is measured (Step S4). Here, this Step S4 is referred to as a "current position acquisition mode".

Then, in the control unit (control device) 12, the deviation (ΔL) between the current distance (L1) measured in Step S4 and the reference distance (L0) measured/stored in Step S1 is calculated and compared with a predetermined value (threshold value: Lt) set in advance (Step S5). This deviation (ΔL) is obtained by ΔL=current distance (L1)−reference distance (L0) and is the amount of fluctuation (stretching amount in the Z-axis direction) of the holder portion (joining head) 5 (joining tool portion 6) which fluctuates due to the influence of heat such as heat input during friction stir welding and an increase in outside air temperature.

When the deviation (ΔL) between the current distance (L1) and the reference distance (L0) reaches the threshold value (Lt) (ΔL≥Lt), according to the command of the control unit (control device) 12, a command signal for moving the position of the joining head 5 (joining tool portion 6) in the Z-axis direction (vertical direction) is output to the apparatus body 2 so that the calculated deviation (ΔL) becomes smaller than the predetermined value (threshold value: Lt). The apparatus body 2 sets the position while controlling the position of the joining head 5 (joining tool portion 6) in the Z-axis direction (vertical direction) at a predetermined rate of change (movement speed: movement rate) (Step S6).

Here, this Step S6 is called "control mode". In this "control mode", the control unit (control device) 12 generates a change position signal (command signal) of the holder portion (joining head) 5 which corrects the amount of the deviation (ΔL) so that the deviation (ΔL) calculated in Step S5 becomes small and outputs the signal to the apparatus body 2.

This change position signal (command signal) moves, for example, the holder portion (joining head) 5 by a predetermined distance per unit time and it is continuously output to the apparatus body 2 until the deviation (ΔL) becomes smaller than the predetermined value (threshold value: Lt). Based on the change position signal (command signal) acquired from the control unit (control device) 12, the apparatus body 2 sets the position of the holder portion (joining head) 5 in the Z-axis direction (vertical direction) and moves the holder portion (joining head) 5 at a predetermined rate of change (movement speed: movement rate).

On the other hand, when the deviation (ΔL) between the current distance (L1) and the reference distance (L0) is less than the predetermined value (threshold value: Lt) (ΔL<Lt), without setting the position of the joining tool portion 6 in the Z-axis direction (vertical direction), friction stir welding of the joint target member is continued while maintaining the joining conditions when the current distance (L1) is measured (Step S7).

After that, according to the command from the control unit (control device) 12, when the moving amount (elapsed time) of the joining tool portion 6 reaches a predetermined value (position/time), the joining tool portion 6 is pulled out from the joint portion of the joint target member and the friction stir welding process is completed (Step S8).

As described above, the friction stir welding method of this example includes a reference position setting step of setting a specific position of the holder portion (joining head) 5 as a reference position in the pre-joining stage before turning on the power to the apparatus body 2 and joining the joint target member, the current position acquisition step of acquiring the current position of the specific position of the holder portion (joining head) 5 described above after executing the reference position setting step and after performing friction stir welding on the joint target member with the joining tool portion 6, and a position correction step of correcting the vertical position of the holder portion (joining head) 5 so that the deviation (ΔL) becomes smaller than the predetermined threshold value (Lt) when the deviation (ΔL) between the reference distance (L0) (or reference position) and the current distance (L1) (or current position) reaches the predetermined threshold value (Lt).

As described above, according to the friction stir welding apparatus and the friction stir welding method of this example, it is possible to correct the fluctuation amount (stretching amount in the Z-axis direction) of the holder portion (joining head) 5 (joining tool portion 6) which fluctuates (displaces) due to the influence of heat.

This enables highly accurate position setting in the Z-axis direction (vertical direction) of the joining tool and enables high-quality (high-precision) joining between the joint target members.

By alternately repeating the above-described "current position acquisition step" and "position correction step", higher quality (high accuracy) joining can be performed.

In Step S2 and Step S8 of FIG. 12, by performing so-called "line joining" in which friction stir welding starts from one end of the joint target member and friction stir welding is continuously performed to the other end of the joint target member, the quality (reliability) of the joint can be further improved.

Further, by the friction stir welding apparatus and the friction stir welding method of this example, the initial position of the joining tool in the Z-axis direction (vertical direction) can be set accurately in the joining condition setting stage, which is the stage before inserting the joining tool into the joint target member. Thus, by applying the invention to a multi-station type friction stir welding apparatus having a plurality of mounting tables 10, the initial position of the joining tool in the Z-axis direction (vertical direction) can be accurately set for each mounting table 10. As a result, high quality (high precision) joining can be performed on all mounting tables 10.

The invention is not limited to the above-described examples and includes various modifications. For example, the above-described examples are described in detail in order to explain the invention in an easy-to-understand manner and are not necessarily limited to those having all the described configurations. In addition, it is possible to replace a part of the configuration of one example with the configuration of another example and it is also possible to add the configuration of another example to the configuration of one example. Further, it is possible to add/delete/replace a part of the configuration of each example with another configuration.

The present application also has the features described in the following appendices 1 to 36.

Appendix 1

A friction stir welding apparatus, including:
a joining tool which consists of a shoulder portion and a probe portion and is inserted into a joint target member to rotate;
a joining head which holds the joining tool;
an apparatus body which holds the joining head, rotates the joining tool, and moves the joining tool;
a control device which controls an operation of the joining tool; and distance measuring means for measuring a distance between a first reference point, which is a predetermined position of the joining head, and a second reference point, which is a predetermined position on the joint target member placed on a mounting table, where
the control device has a measurement mode where, in a stage before the joining tool is inserted into the joint target member, a tip position of the joining tool is lowered to a Z-axis direction position at the time of joining to perform alignment and a reference distance, which is a distance between the first reference point and the second reference point, is acquired from the distance measuring means without joining the joint target member.

Appendix 2

The friction stir welding apparatus according to Appendix 1, where
by moving the joining head in a joining direction in the measurement mode, the control device moves the first reference point and the second reference point from a joining start position to a joining end position on the joint target member and acquires the reference distance continuously or at predetermined intervals.

Appendix 3

The friction stir welding apparatus according to Appendix 1 or 2, where
the control device has a control mode where, after the joining tool is inserted into the joint target member, a current distance, which is a distance between the first reference point and the second reference point on the joint target member, is acquired from the distance measuring means,
a deviation between the acquired current distance and the corresponding reference distance is calculated, and
when the calculated deviation exceeds a predetermined value, a change position signal of the joining head which corrects the deviation in a direction opposite to a direction in which the deviation occurs in a Z-axis direction is generated and output to the apparatus body.

Appendix 4

The friction stir welding apparatus according to Appendix 1 or 2, where
the control device has a control mode where, after the joining tool is inserted into the joint target member, a current distance, which is a distance between the first reference point and the second reference point on the joint target member, is acquired from the distance measuring means,
a deviation between the acquired current distance and the corresponding reference distance is calculated,
a change position signal which moves the joining head by a predetermined distance per unit time in a direction opposite to a direction in which the deviation occurs in a Z-axis direction is generated when the calculated deviation exceeds a predetermined value, and
it is continuously output to the apparatus body until the current distance reaches within a range of the predetermined value.

Appendix 5

The friction stir welding apparatus according to Appendix 3 or 4, where
the apparatus body sets a position of the joining head in the Z-axis direction based on the change position signal acquired from the control device and moves the joining head at a predetermined rate of change.

Appendix 6

The friction stir welding apparatus according to Appendix 3 or 4, where
the control device repeats the control mode at predetermined time intervals.

Appendix 7

The friction stir welding apparatus according to Appendix 1 or 2, where
in the measurement mode, the joining tool is removed from the joining head and the reference distance is acquired.

Appendix 8

The friction stir welding apparatus according to Appendix 1, where
the first reference point is a distance measuring signal irradiation point of the distance measuring means.

Appendix 9

The friction stir welding apparatus according to Appendix 1, where
the distance measuring means is a displacement sensor.

Appendix 10

The friction stir welding apparatus according to Appendix 9, where
the displacement sensor is either non-contact or contact type.

Appendix 11

The friction stir welding apparatus according to Appendix 1, where
the distance measuring means is installed on a traveling direction side of the joining tool in the joining head.

Appendix 12

The friction stir welding apparatus according to Appendix 1, where
the apparatus body starts friction stir welding from one end of the joint target member and continuously performs friction stir welding to the other end of the joint target member.

Appendix 13

A friction stir welding method in which joint target members are joined by friction stir welding, including the steps of:
(a) performing alignment by lowering a tip position of a joining tool to a Z-axis direction position at the time of joining in a stage before the joining tool is inserted into the joint target member and measuring a reference distance, which is a distance between a first reference point, which is a predetermined position of the joining head, and a second reference point, which is a position facing the first reference point and is a predetermined position on the joint target member, at a joining start position;

(b) shifting to a joining stage of inserting the joining tool into the joint target member and joining the joint target member after a process of (a);
(c) measuring a current distance, which is a distance between the first reference point and the second reference point, in the joining stage after a process of (b); and (d) calculating a deviation between the current distance and the reference distance and setting a position of the joining head corrected for a magnitude of the deviation in a direction opposite to a direction in which the deviation occurs in a Z-axis direction of the joining tool when the calculated deviation exceeds a predetermined value or continuously controlling the position of the joining head so as to move the joining head by a predetermined distance per unit time until the deviation reaches within a range of the predetermined value in the direction opposite to the direction in which the deviation occurs in the Z-axis direction.

Appendix 14

A friction stir welding apparatus, including:
a joining tool which consists of a shoulder portion and a probe portion and is inserted into a joint target member to rotate;
a joining head which holds the joining tool;
an apparatus body which holds the joining head, rotates the joining tool, and moves the joining tool;
a control device which controls an operation of the joining tool; and
distance measuring means for measuring a distance between a first reference point, which is a predetermined position of the joining head, and a second reference point, which is a predetermined position on a mounting table on which the joint target member is placed, where
the control device has a measurement mode where, in a stage before the joining tool is inserted into the joint target member, a tip position of the joining tool is lowered to a Z-axis direction position at the time of joining to perform alignment, and
acquires a reference distance, which is a distance between the first reference point and the second reference point on the mounting table, from the distance measuring means.

Appendix 15

The friction stir welding apparatus according to Appendix 14, where
the control device has a control mode where, after the joining tool is inserted into the joint target member, a current distance, which is a distance between the first reference point and the second reference point on the mounting table, is acquired from the distance measuring means,
a deviation between the acquired current distance and the reference distance is calculated, and
when the calculated deviation exceeds a predetermined value, a change position signal of the joining head which corrects the deviation in a direction opposite to a direction in which the deviation occurs in a Z-axis direction is generated and it is output to the apparatus body.

Appendix 16

The friction stir welding apparatus according to Appendix 14, where
the control device has a control mode where, after the joining tool is inserted into the joint target member, a current distance, which is a distance between the first reference point and the second reference point on the mounting table, is acquired from the distance measuring means, a deviation between the acquired current distance and the reference distance is calculated, when the calculated deviation exceeds a predetermined value, a change position signal which moves the joining head by a predetermined distance per unit time in a direction opposite to a direction in which the deviation occurs in the Z-axis direction is generated, and it is continuously output to the apparatus body until the current distance reaches within a range of the predetermined value.

Appendix 17

The friction stir welding apparatus according to Appendix 15 or 16, where the apparatus body sets a position of the joining head in the Z-axis direction based on the change position signal acquired from the control device and moves the joining head at a predetermined rate of change.

Appendix 18

The friction stir welding apparatus according to Appendix 15 or 16, where the control device repeats the control mode at predetermined time intervals.

Appendix 19

The friction stir welding apparatus according to Appendix 14, where the first reference point is a distance measuring signal irradiation point of the distance measuring means.

Appendix 20

The friction stir welding apparatus according to Appendix 14, where the distance measuring means is a displacement sensor.

Appendix 21

The friction stir welding apparatus according to Appendix 20, where the displacement sensor is either non-contact or contact type.

Appendix 22

The friction stir welding apparatus according to Appendix 14, where the distance measuring means is installed in the joining head on a side opposite to a traveling direction of the joining tool.

Appendix 23

The friction stir welding apparatus according to Appendix 14, where the apparatus body starts friction stir welding from one end of the joint target member and continuously performs friction stir welding to the other end of the joint target member.

Appendix 24

A friction stir welding method in which joint target members are joined by stir welding, including the steps of:

(a) performing alignment by lowering a tip position of a joining tool to a Z-axis direction position at the time of joining in a stage before the joining tool is inserted into the joint target member and measuring a reference distance, which is a distance between a first reference point, which is a predetermined position of the joining head, and a second reference point, which is a position facing the first reference point and is a predetermined position on a mounting table on which the joint target member is placed, at a joining start position;

(b) shifting to a joining stage of inserting the joining tool into the joint target member and joining the joint target member after a process of (a);

(c) measuring a current distance, which is a distance between the first reference point and the second reference point, in the joining stage after a process of (b); and (d) calculating a deviation between the current distance and the reference distance and setting a position of the joining head corrected for a magnitude of the deviation in a direction opposite to a direction in which the deviation occurs in a Z-axis direction of the joining tool when the calculated deviation exceeds a predetermined value or continuously controlling the position of the joining head so as to move the joining head by a predetermined distance per unit time until the deviation reaches within a range of the predetermined value in the direction opposite to the direction in which the deviation occurs in the Z-axis direction.

Appendix 25

A friction stir welding apparatus, including:

a joining tool which is inserted into a joint target member, progresses while rotating, and joins the joint target member;

a joining head which holds the joining tool;

an apparatus body which holds the joining head, rotates the joining tool, and advances the joining tool;

distance measuring means which measures a distance between a first reference point, which is a predetermined position of the joining head, and a second reference point, which faces the first reference point in a vertical direction on a mounting table on which the joint target member is placed; and a control device, where the control device has a reference distance measurement mode where, in a pre-joining stage before the joint target member is subjected to friction stir welding by the joining tool, a reference distance, which is a distance between the first reference point and the second reference point, is acquired from the distance measuring means, and a current distance measurement mode where, after executing the reference distance measurement mode and after performing friction stir welding on the joint target member with the joining tool, a current distance, which is a distance between the first reference point and the second reference point, is acquired from the distance measuring means, calculates a deviation between the reference distance and the current distance after executing the current distance measurement mode, and has a control mode where a command signal for moving a vertical position of the joining head is output to the apparatus body so that the deviation becomes smaller than a predetermined threshold value when the deviation reaches the predetermined threshold value, and the apparatus body moves the vertical position of the joining head at a predetermined movement rate based on the command signal.

Appendix 26

The friction stir welding apparatus according to Appendix 25, where the control device alternately repeats the current distance measurement mode and the control mode.

Appendix 27

The friction stir welding apparatus according to Appendix 25, where
the distance measuring means is a non-contact displacement sensor.

Appendix 28

A friction stir welding method in which a joint target member is joined by friction stir welding, including the steps of:
reference distance measurement step of measuring, in a state where an apparatus body is turned on and a pre-joining stage before joining the joint target member, a reference distance between a first reference point, which is a predetermined position of a joining head, and a second reference point, which is vertically opposed to the first reference point on amounting table on which the joint target member is placed;
current distance measurement step of measuring, after performing the reference distance measurement step and after performing friction stir welding on the joint target member with the joining tool, the current distance between the first reference point and the second reference point; and
position correction step of correcting, when a deviation between the reference distance and the current distance reaches a predetermined threshold value, a vertical position of the joining head so that the deviation becomes smaller than the predetermined threshold value, where
the apparatus body moves the vertical position of the joining head at a predetermined movement rate in the position correction step.

Appendix 29

The friction stir welding method according to Appendix 28, where
the current distance measurement step and the position correction step are alternately repeated.

Appendix 30

A friction stir welding apparatus, including:
a joining tool which is inserted into a joint target member, progresses while rotating, and joins the joint target member;
a joining head which holds the joining tool;
an apparatus body which holds the joining head, rotates the joining tool, and advances the joining tool; and
a first partition in which an auxiliary light irradiation device which irradiates imaging auxiliary light rays is arranged and a second partition which is arranged so as to face the first partition in a horizontal direction and has image acquisition means for acquiring image information of the joining tool obtained by irradiating the imaging auxiliary light rays on a mounting table on which the joint target member is placed.

Appendix 31

The friction stir welding apparatus according to Appendix 30, further including:
a control device, where
the control device has a reference position setting mode where, in a pre-joining stage before performing friction stir welding on the joint target member with the joining tool, the image information is acquired from the image acquisition means and a specific position of the acquired image information is set as a reference position.

Appendix 32

The friction stir welding apparatus according to Appendix 31, where
the control device has a current position acquisition mode where, after executing the reference position setting mode and after performing friction stir welding on the joint target member with the joining tool, the image information is acquired from the image acquisition means and a specific position of the image information is acquired as a current position.

Appendix 33

The friction stir welding apparatus according to Appendix 32, where
the control device has a control mode where, after executing the current position acquisition mode, a deviation between the reference position and the current position is calculated, and
when the deviation reaches a predetermined threshold value, a command signal for moving a vertical position of the joining head is output to the apparatus body so that the deviation becomes smaller than the predetermined threshold value.

Appendix 34

The friction stir welding apparatus according to Appendix 33, where
the apparatus body moves the vertical position of the joining head at a predetermined movement rate based on the command signal.

Appendix 35

The friction stir welding apparatus according to Appendix 32, where
the reference position is a predetermined position of the joining tool excluding a joining pin and a shoulder portion within an irradiation range of imaging auxiliary light rays emitted from the auxiliary light irradiation device in the pre-joining stage, and
at the end of friction stir welding, the predetermined position is acquired as the current position.

Appendix 36

The friction stir welding apparatus according to Appendix 33, where
the control device alternately repeats the current position acquisition mode and the control mode.

REFERENCE SIGNS LIST

1: friction stir welding apparatus
2: apparatus body
3: vertical movement drive mechanism unit (ball screw)
4: holder portion (joining head) holding unit
5: holder portion (joining head)
6: joining tool portion
7: shoulder portion
8: probe portion (joining pin)
9, 9a, 9b: joint target member 10: mounting table
11: distance measurement sensor
12: control unit (control device)
12a: image processing device (dimension measuring means)
13: (X-axis direction) linear drive mechanism unit
14: rail of linear guide (X-axis)
15: (Y-axis direction) linear drive mechanism unit
16: rail of linear guide (Y-axis)
17: tip position measuring unit
17a: first partition (auxiliary light irradiation device)
17b: second partition (image sensor)

The invention claimed is:

1. A friction stir welding apparatus comprising:
a joining tool which consists of a shoulder portion and a probe portion and is inserted into a joint target member to rotate;
a joining head which holds the joining tool;
an apparatus body which holds the joining head, rotates the joining tool, and moves the joining tool; and
a control device which controls an operation of the joining tool, wherein
the control device has a reference position setting mode where a correction reference used for correction of misalignment in a Z-axis direction of the joining tool which occurs when the joint target member is joined by the joining tool is set in a stage before the joining tool is inserted into the joint target member,
a joining mode where the joining tool is inserted into the joint target member and the joint target member is joined, and
a correction mode where an amount of position fluctuation of a tip of the joining tool with respect to the correction reference which occurs when the joining tool joins the joint target member is measured and correction is performed when the amount of position fluctuation exceeds a predetermined threshold value, wherein
the joining head is provided with distance measuring means, and
in the reference position setting mode, the control device lowers the tip of the joining tool to a position in the Z-axis direction at the time of joining to perform alignment, acquires a distance between a first reference point provided at a predetermined position of the joining head and a second reference point provided at a predetermined position of the joint target member placed on a mounting table by the distance measuring means, and sets it as the correction reference.

2. The friction stir welding apparatus according to claim 1, wherein
the control device repeats the joining mode and the correction mode after executing the reference position setting mode.

3. The friction stir welding apparatus according to claim 1, wherein
the control device shifts from the reference position setting mode to the joining mode and acquires a current distance, which is a distance between the first reference point after the joining tool is inserted into the joint target member and the second reference point on the joint target member from the distance measuring means,
shifts from the joining mode to the correction mode,
calculates a deviation from the correction reference corresponding to the current distance, and
generates a change position signal of the joining head which corrects the deviation in a direction opposite to a direction in which the deviation occurs in the Z-axis direction when the deviation reaches a predetermined value and outputs it to the apparatus body.

4. The friction stir welding apparatus according to claim 1, wherein
acquires a distance between a first reference point provided at a predetermined position of the joining head and a second reference point provided at a predetermined position on a mounting table by the distance measuring means and sets it as the correction reference.

5. The friction stir welding apparatus according to claim 4, wherein
the control device shifts from the reference position setting mode to the joining mode and acquires a current distance, which is a distance between the first reference point after the joining tool is inserted into the joint target member and the second reference point on the mounting table, from the distance measuring means,
shifts from the joining mode to the correction mode, and
calculates a deviation between the current distance and the correction reference, generates a change position signal of the joining head which corrects the deviation in a direction opposite to a direction in which the deviation occurs in the Z-axis direction when the deviation reaches a predetermined value, and outputs it to the apparatus body.

6. The friction stir welding apparatus according to claim 1, wherein
the control device acquires a distance between a first reference point provided at a predetermined position of the joining head and a second reference point provided at a predetermined position on a mounting table by the distance measuring means in the reference position setting mode and sets it as the correction reference,
shifts from the reference position setting mode to the joining mode,
acquires a distance between the first reference point and the second reference point as the current distance from the distance measuring means after the joining tool finishes a joining process,
shifts from the joining mode to the correction mode, and
calculates a deviation between the current distance and the correction reference, generates a change position signal of the joining head which corrects the deviation in a direction opposite to a direction in which the deviation occurs in the Z-axis direction when the deviation reaches a predetermined value, and outputs it to the apparatus body.

7. The friction stir welding apparatus according to claim 1, comprising:
a first partition in which an auxiliary light irradiation device which irradiates imaging auxiliary light rays is arranged on a mounting table; and
a second partition which is arranged so as to face the first partition in a horizontal direction and has image acquisition means for acquiring image information of the joining tool obtained by irradiating the imaging auxiliary light rays.

8. The friction stir welding apparatus according to claim 7, wherein
the control device acquires the image information from the image acquisition means in the reference position setting mode and sets a specific position of the image information as the correction reference.

9. The friction stir welding apparatus according to claim 8, wherein
 the control device shifts from the reference position setting mode to the joining mode, acquires the image information from the image acquisition means after a joining process by the joining tool, and acquires the specific position of the image information as the current position,
shifts from the joining mode to the correction mode, and
calculates a deviation between the current position and the correction reference, generates a change position signal of the joining head which corrects the deviation in a direction opposite to a direction in which the deviation occurs in the Z-axis direction when the deviation reaches a predetermined value, and output it to the apparatus body.

\* \* \* \* \*